(12) United States Patent
Li et al.

(10) Patent No.: US 10,789,506 B2
(45) Date of Patent: Sep. 29, 2020

(54) OBJECT INTRUSION DETECTION SYSTEM AND METHOD

(71) Applicant: Rockwell Automation Technologies, Inc., Mayfield Heights, OH (US)

(72) Inventors: Mei Li, Wellesley, MA (US); Frederic Boutaud, Lexington, MA (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 102 days.

(21) Appl. No.: 16/139,436

(22) Filed: Sep. 24, 2018

(65) Prior Publication Data

US 2020/0097755 A1   Mar. 26, 2020

(51) Int. Cl.
*G06K 9/00* (2006.01)
*G06K 9/62* (2006.01)
(Continued)

(52) U.S. Cl.
CPC ......... *G06K 9/6202* (2013.01); *G06F 1/3206* (2013.01); *G06F 16/2237* (2019.01); *G06F 17/18* (2013.01); *G08B 13/19602* (2013.01)

(58) Field of Classification Search
CPC .............. G08B 13/181; G08B 13/2491; G08B 13/19602; G06F 17/18; G06F 16/2237;
(Continued)

(56) References Cited

U.S. PATENT DOCUMENTS 7,623,221 B2   11/2009   Thun et al.
9,880,266 B2   1/2018   Davidovic et al.
(Continued)

FOREIGN PATENT DOCUMENTS

EP   2 402 784 A2   1/2012
EP   3 015 881 A2   5/2016
(Continued)

OTHER PUBLICATIONS

IEC, "Safety of machinery—Electro-sensitive protective equipment—Part 3: Particular requirements for Active Opto-electronic Protective Devices responsive to Diffuse Reflection (AOPDDR)", International Standard, IEC 61496-3, Edition 2.0, Feb. 2008, 144 pages.
(Continued)

*Primary Examiner* — Mahendra R Patel
(74) *Attorney, Agent, or Firm* — Amin, Turocy & Watson, LLP

(57) ABSTRACT

A three-dimensional (3D) sensor device achieves high intrusion detection probability while keeping the probability of a false intrusion detection low by capturing a set of multiple spatial or temporal samples of a measured parameter for an object detected in the sensor's field of view. When an object is detected in the field of view, the TOF sensor device defines a window of N pixels comprising a subset of the pixels corresponding to the object, and obtains N distance measurements corresponding to the N pixels of the window. If the number of the N distance values that are less than a defined threshold distance is equal to or greater than a selected threshold value M (an integer less than N), the TOF sensor device determines that the object is intruding within a protective field and generates a suitable output.

20 Claims, 24 Drawing Sheets

(51) Int. Cl.
*G06F 16/22* (2019.01)
*G06F 1/3206* (2019.01)
*G06F 17/18* (2006.01)
*G08B 13/196* (2006.01)

(58) Field of Classification Search
CPC ........ G06F 1/3206; G01S 17/10; G01S 17/04; G01S 17/89; G01S 7/4863; G01C 3/08; H04N 5/335; H01L 27/14641; H01L 27/14609; H01L 31/101; G01N 21/00; G06K 9/00; G06K 9/6202
USPC ............................................ 382/107; 340/345
See application file for complete search history.

(56) References Cited

U.S. PATENT DOCUMENTS

| | | | |
|---|---|---|---|
| 2006/0192938 A1* | 8/2006 | Kawahito | H04N 5/335 356/5.03 |
| 2007/0109653 A1* | 5/2007 | Schofield | B60R 21/01538 359/604 |
| 2007/0146682 A1 | 6/2007 | Tachino et al. | |
| 2007/0158533 A1* | 7/2007 | Bamji | H04N 5/335 250/208.1 |
| 2008/0079833 A1* | 4/2008 | Ichikawa | H01L 27/14643 348/311 |
| 2008/0297360 A1* | 12/2008 | Knox | G08B 17/125 340/628 |
| 2011/0037969 A1* | 2/2011 | Spickermann | H01L 27/14643 356/5.01 |
| 2011/0043806 A1* | 2/2011 | Guetta | G08B 13/181 356/432 |
| 2011/0058167 A1* | 3/2011 | Knox | G01N 15/06 356/338 |
| 2011/0194099 A1 | 8/2011 | Kamiyama | |
| 2012/0025964 A1* | 2/2012 | Beggs | B60Q 1/2673 340/435 |
| 2012/0200841 A1 | 8/2012 | Kamiyama et al. | |
| 2012/0262696 A1* | 10/2012 | Eisele | G01S 7/4863 356/4.01 |
| 2014/0240692 A1* | 8/2014 | Tien | G01S 17/894 356/5.01 |
| 2015/0362586 A1 | 12/2015 | Heinrich | |
| 2016/0124089 A1* | 5/2016 | Meinherz | G01S 17/87 356/5.01 |
| 2016/0161611 A1* | 6/2016 | Ito | G01S 17/003 356/51 |
| 2016/0342840 A1* | 11/2016 | Mullins | G06K 9/00671 |
| 2018/0045513 A1* | 2/2018 | Kitamura | G01S 17/894 |
| 2018/0246214 A1* | 8/2018 | Ishii | H04N 5/3575 |
| 2018/0299554 A1 | 10/2018 | Van Dyck et al. | |
| 2018/0329063 A1* | 11/2018 | Takemoto | G01S 17/86 |
| 2019/0081095 A1 | 3/2019 | Hanzawa et al. | |
| 2019/0174120 A1 | 6/2019 | Wang | |
| 2019/0179017 A1* | 6/2019 | Nagai | G01C 3/06 |
| 2019/0187290 A1* | 6/2019 | Kim | G01S 17/08 |
| 2019/0281276 A1 | 9/2019 | Wang et al. | |

FOREIGN PATENT DOCUMENTS

| | | | | |
|---|---|---|---|---|
| EP | 3015881 A2 * | 5/2016 | | G01S 17/894 |
| EP | 3 141 930 A1 | 3/2017 | | |
| KR | 10-2017-0140786 A | 12/2017 | | |
| WO | 2008/152647 A2 | 12/2008 | | |
| WO | WO-2008152647 A2 * | 12/2008 | | G01S 7/4863 |
| WO | WO-2017045618 A1 * | 3/2017 | | G06T 7/174 |
| WO | WO-2018042887 A1 * | 3/2018 | | G01C 3/06 |

OTHER PUBLICATIONS

Trunk, G.V., "Automatic Detection, Tracking, and Sensor Integration", Chapter 8, Naval Research Laboratory, pp. 8.1-8.23.
Non-Final Office Action received for U.S. Appl. No. 15/708,268 dated Oct. 18, 2019, 41 pages.
Zach et al., "A 2x32 Range-Fim:ling Sensor Array with Pixel-Inherent Suppression of Ambient Light up to 120Klx", Sensors and Mems, 20.7, IEEE International Solid-State Circuits Conference, 2009, pp. 352-353.
Davidovic et al., "A 33×25 µm2 Low-Power Range Finder", IEEE, 2012, pp. 922-925.
Chen et al., "Development of a Low-cost Ultra-tiny Line Laser Range Sensor", IEEE/RSJ International Conference on Intelligent Robots and Systems (IROS), Oct. 9-14, 2016, pp. 111-116.
Notice of Allowance received for U.S. Appl. No. 15/708,294 dated Oct. 31, 2019, 21 pages.
Extended European Search Report received for EP Patent Application Serial No. 19173193.4 dated Oct. 25, 2019, 9 pages.
Communication pursuant to Rule 69 EPC received for EP Patent Application Serial No. 19173193.4 dated Dec. 2, 2019, 2 pages.
Extended European Search Report received for EP Patent Application Serial No. 19173194.2 dated Oct. 25, 2019, 8 pages.
Communication pursuant to Rule 69 EPC received for EP Patent Application Serial No. 19173194.2 dated Dec. 2, 2019, 2 pages.
Extended European Search Report received for EP Patent Application Serial No. 19185081.7 dated Nov. 18, 2019, 10 pages.
Communication pursuant to Rule 69 EPC received for EP Patent Application Serial No. 19185081.7 dated Jan. 20, 2020, 2 pages.
Extended European Search Report received for European Patent Application Serial No. 19198920.1 dated Feb. 5, 2020, 8 pages.
Communication pursuant to Rule 69 EPC received for EP Patent Application Serial No. 19198920.1 dated Mar. 30, 2020, 2 pages.

* cited by examiner

OBJECT INTRUSION DETECTION SYSTEM AND METHOD

BACKGROUND

The subject matter disclosed herein relates generally to optical sensor devices, and, more particularly, to optical sensors that detect intrusion of objects into a monitored protective field.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a sensor device is provided, comprising a distance determination component configured to receive pixel data associated with respective pixels of a field of view, and to identify an object within the field of view corresponding to a first subset of the pixels; an intrusion detection component configured to define a pixel window comprising a second subset of the first subset of the pixels, wherein the second subset comprises N pixels, and N is an integer, wherein the distance determination component is further configured to determine N distance values corresponding to the N pixels of the pixel window based on a subset of the pixel data corresponding to the second subset of the first subset of the pixels, and the intrusion detection component is further configured to: count a number K of the N distance values that are less than a defined distance threshold, and in response to determining that the number K of the N distance values that are less than the defined distance threshold is equal to or greater than a defined threshold value M, generate an indication that the object is within a protective field monitored by the sensor device.

Also, one or more embodiments provide a method for detecting intrusion of an object within a protective field, comprising receiving, by a sensor device comprising a processor, pixel data for respective pixels of a field of view; identifying, by the sensor device based on analysis of the pixel data, an object within the field of view, wherein the object corresponds to a first subset of the pixels; defining, by the sensor device, a pixel window comprising a second subset of the first subset of the pixels, wherein the second subset comprises N pixels, and N is an integer; determining, by the sensor device, N distance values corresponding to the N pixels of the pixel window based on the pixel data; counting, by the sensor device, a number K of the N distance values that are less than a defined distance threshold; and in response to determining that the number K of the N distance values that are less than the defined distance threshold is equal to or greater than a defined threshold value M, generating, by the sensor device, an indication that the object is within a protective field monitored by the sensor device.

Also, according to one or more embodiments, a non-transitory computer-readable medium is provided having stored thereon instructions that, in response to execution, cause a sensor device comprising a processor to perform operations, the operations comprising receiving pixel data for respective pixels of a field of view; identifying an object within the field of view based on analysis of the pixel data, wherein the object corresponds to a first subset of the pixels; defining a pixel window comprising a second subset of the first subset of the pixels, wherein the second subset comprises N pixels, and N is an integer; determining N distance values corresponding to the N pixels of the pixel window based on a subset of the pixel data corresponding to the second subset of the first subset of the pixels; counting a number K of the N distance values that are less than a defined distance threshold; and in response to determining that the number K of the N distance values that are less than the defined distance threshold is equal to or greater than a defined threshold value M, outputting an indication that the object is within a protective field monitored by the sensor device To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
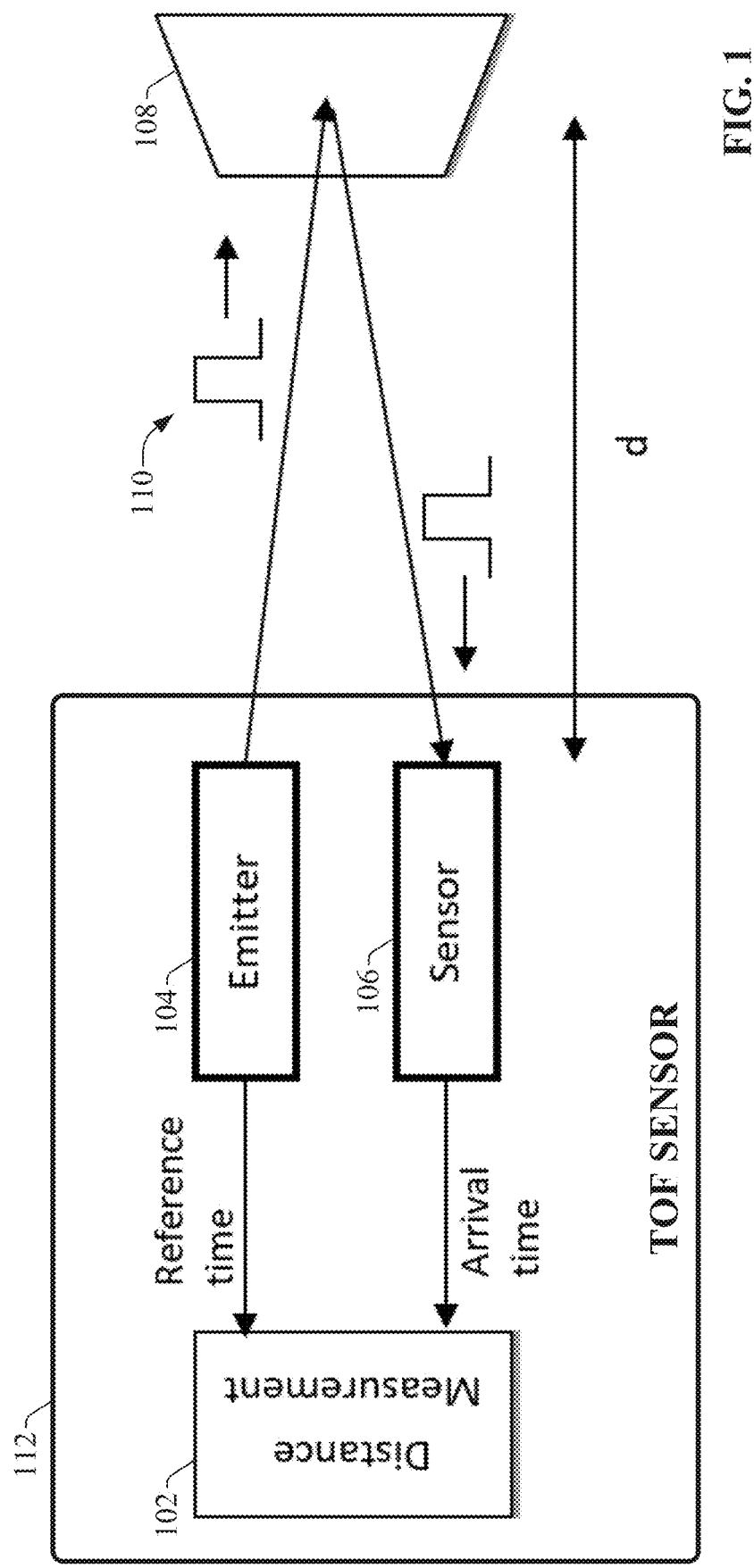
FIG. 1 is a generalized block diagram of a TOF sensor illustrating pulsed light time of flight principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many technologies exist for detecting distances of objects or surfaces within a monitored space. These include, but are not limited to, time of flight (TOF) optical sensors or other types of three-dimensional sensors—such as photo detectors or multi-pixel image sensors—which are used to detect distances of objects or surfaces within a viewing range of the sensor. These optical sensors can include, for example, photo detectors that measure and generate a single distance data point for an object within range of the detector, as well as multi-pixel image sensors comprising an array of photo-detectors that are each capable of generating a distance data point for a corresponding image pixel. Some three-dimensional optical sensors, such as stereo vision technology (for a passive sensor) or structure light technology (for active sensor) measure distances using triangulation. Non-optical technologies, such as radio frequency or sound, can also be used to measure distances.

Some types of TOF sensors that employ pulsed light illumination measure the elapsed time between emission of a light pulse to the viewing field (or viewing space) and receipt of a reflected light pulse at the sensor's photo-receiver. Since this time-of-flight information is a function of the distance of the object or surface from the sensor, the sensor is able to leverage the TOF information to determine the distance of the object or surface point from the sensor.

FIG. 1 is a generalized block diagram of a TOF sensor 112 illustrating pulsed light time of flight principles. In general, the sensing technology used by some TOF sensors measures the time taken by a light pulse to travel from the sensor's illumination light source—represented by emitter 104—to an object 108 or surface within the viewing field and back to the sensor's light photo-detectors, represented by sensor 106. Sensor 106 can be, for example a dedicated multi-pixel CMOS (complementary metal oxide semiconductor) application-specific integrated circuit (ASIC) imager that integrates specialized means for measuring the position in time of received pulses. Distance measurement components 102 can measure the distance d to the object 108 as $$d=(c/2)t \qquad (1)$$

where c is the speed of light, and t is the measured time of the round trip for the pulse from the emitter 104 to the object 108 and back to the sensor 106.

Emitter 104 of the TOF sensor 112 emits a short pulse 110 into the viewing field. Objects and surfaces within the viewing field, such as object 108, reflect part of the pulse's radiation back to the TOF sensor 112, and the reflected pulse is detected by respective pixels of sensor 106 (e.g., a photo-detector or a photo-sensor such as a photo-diode). Since the speed of light c is a known constant and the time t elapsed between emission and reception of the pulse 110 can be measured, the distance measurement components 102 can determine, for each pixel of the sensor 106, the distance between the object 108 and the sensor by calculating half of the round-trip distance, as given by equation (1) above. Collectively, the distance information obtained for all pixels of the viewing space yields depth map or point cloud data for the viewing space. In some implementations, distance measurement components 102 can include a timer that measures the arrival time of the received pulse relative to the time at which emitter 104 emitted the pulse. In general, the TOF sensor 112 generates information that is representative of the position in time of the received pulse.

Each pixel of the captured image has an associated photo-receiver or photo-detector. When radiation of the reflected pulse is incident on the photo-receivers or photo-detectors that make up sensor 106, the incident light is converted into an electrical output proportional to the intensity of the incident light. The distance measurement components 102 then recover and analyze the electrical output in order to identify the pulse, thereby determining that the reflected pulse has been received at the sensor 106.

In some implementations, the photo-detectors of sensor 106 accumulate electrical charges based on the exposure duration of the sensor 106 to the received light pulse radiation relative to a time reference. The accumulated charges on a given photo-detector translate into a voltage value that is used by the distance measurement components 102 to recognize the pulse. Once the pulse is identified, the distance measurement components 102 can estimate the time that the reflected pulse was received at the photo-detector relative to the time that the pulse was emitted, and the distance associated with the corresponding pixel can be estimated based on this time using equation (1) (or another distance determination equation or algorithm that defined distance as a function of light pulse propagation time).

If a TOF sensor's distance calculation capabilities are sufficiently reliable, the sensor can serve as an industrial safety device for an industrial safety system. In an example implementation, the TOF sensor could be oriented to monitor for intrusion of people or objects within a defined industrial area or zone, and to initiate a safety measure in response to a determination that a measured distance of a detected person or object within the monitored zone satisfies a defined criterion (e.g., when the distance is less than a defined safe distance from hazardous industrial equipment or a prohibited equipment area). Such safety actions can include, for example, disconnecting power from a hazardous automated machine, placing the machine in a safe operating mode (e.g., a slow operating mode), altering the trajectory of the machine to avoid the path of a detected person, etc. If used in such industrial safety applications, the TOF sensor must be able to detect the presence of an object with a high level of certainty in order to meet standard safety requirements and to guarantee safe operation of the industrial equipment. Viewed another way, the distance detection capabilities of the TOF sensor must be such that the probability of failing to detect an object within the TOF sensor's field of view is low. Ideally, this high level of object detection reliability should be achieved while minimizing the probability of false object detection alerts, which can result in unnecessary safety countermeasure being initiated, translating to excessive machine downtime and lost productivity.

An intruding object or person (that is, an object or person identified as being located within a define intrusion zone) can be detected based on a comparison of distance values measured for the object or person over a number of measurements with a defined threshold distance indicative of the intrusion zone. In general, measured distance values can be prone to uncertainties induced by imperfections of the measurement equipment (e.g., the reading paths of the sensor's photo-detectors) and calculation techniques. These imperfections negatively impact the probability of object detection. While filtering techniques can be used to reduce the level of noise in the photo-detector measurements and thus improve the precision of the distance measurements, filtering alone has a limited ability to improve the probability of object detection, especially if the distribution of the measured values (the tail of the distribution) is not Gaussian. Achieving a required high detection probability—whereby the tail of the distribution representing objects that are not detected is very low—can be expensive in terms of response time and tolerance margin.

To address these and other issues, one or more embodiments of the TOF sensor devices described herein improve intrusion detection reliability by leveraging a set of multiple spatial or temporal samples of a given measured parameter, such as distance. In one or more embodiments, when an object is detected in the TOF sensor device's field of view, the TOF sensor device defines a window of N pixels comprising a subset of the pixels corresponding to the object, and obtains N distance measurements or samples corresponding to the N pixels of the window. The TOF sensor device then determines how many of the N distance measurements are less than a threshold distance $D_P$ representing a distance of a boundary of a protective field monitored by the TOF sensor device, indicating a possible intrusion of the object into the protective field. The number of the N distance measurements that are less than the threshold distance $D_P$ is represented by K. If the number (K) of the N distance values that are less than the threshold distance $D_P$ is equal to or greater than a selected threshold value M (an integer less than N)—that is, if K>=M—the TOF sensor device determines that the object is intruding within the protective field and generates a suitable output (e.g., a notification or a safety output). The threshold value M can be selected to substantially optimize an intrusion detection probability while keeping the probability of a false intrusion detection low. In some embodiments, the TOF sensor device can perform filtering or outlier removal on the N distance values prior to comparison with the threshold distance $D_P$.

Figure 2:
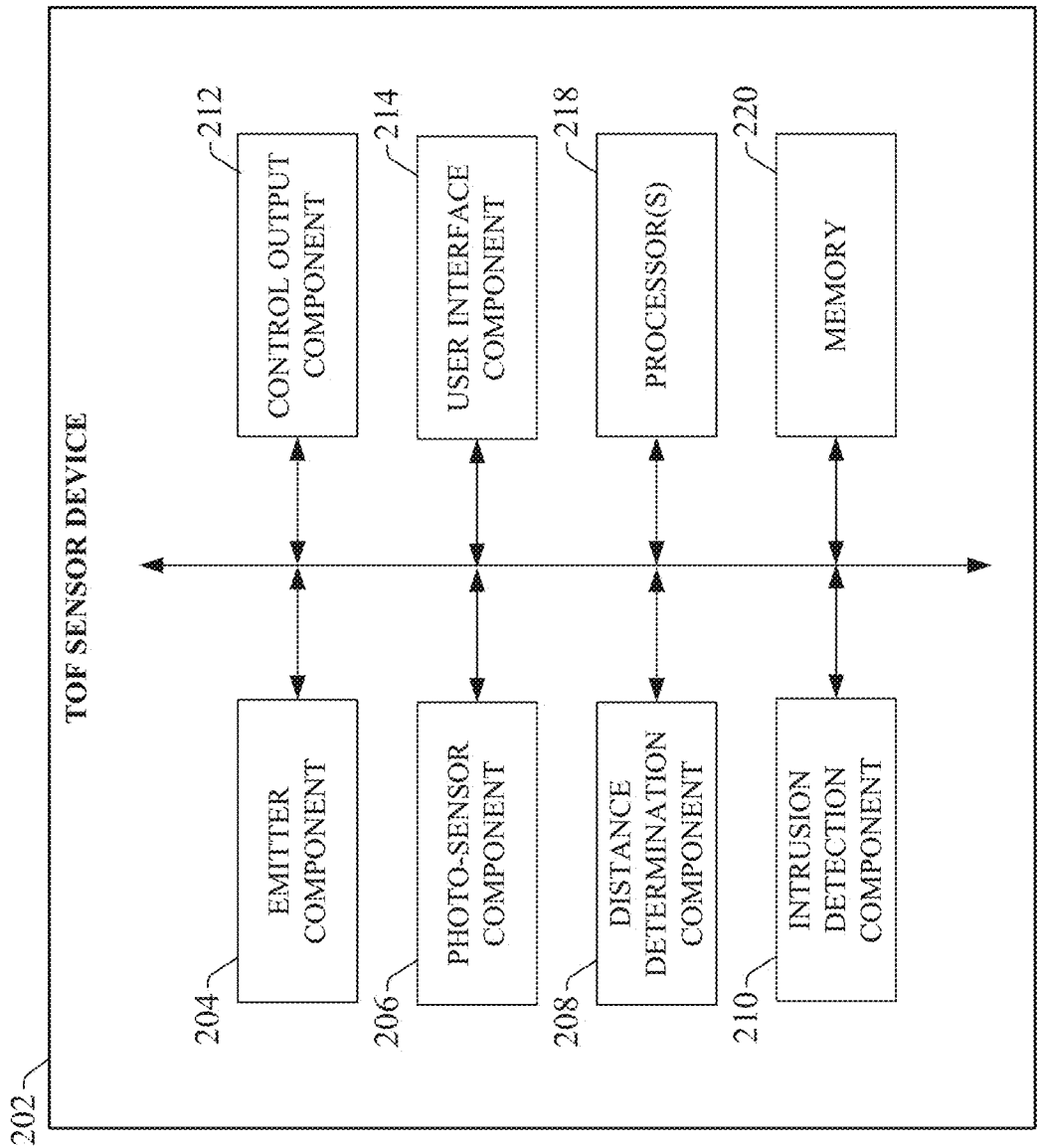
FIG. 2 is a block diagram of an example TOF sensor device.

FIG. 2 is a block diagram of an example TOF sensor device 202 according to one or more embodiments of this disclosure. Although FIG. 2 depicts certain functional components as residing on TOF sensor device 202, it is to be appreciated that one or more of the functional components illustrated in FIG. 202 may reside on a separate device relative to TOF sensor device 202 in some embodiments. Also, although the subject intrusion detection techniques are described herein in connection with TOF sensor devices, it is to be appreciated that the intrusion detection techniques described herein can be implemented in other types of 3D sensors that are capable of generating a distance map or point cloud data (including but not limited to optical and non-optical sensing systems). Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 202 can include an emitter component 204, a photo-sensor component 206, a distance determination component 208, an intrusion detection component 210, a control output component 212, a user interface component 214, one or more processors 218, and memory 220. In various embodiments, one or more of the emitter component 204, photo-sensor component 206, distance determination component 208, intrusion detection component 210, control output component 212, user interface component 214, the one or more processors 218, and memory 220 can be electrically and/or communicatively coupled to one another to perform one or more of the functions of the TOF sensor device 202. In some embodiments, one or more of components 204, 206, 208, 210, 212, and 214 can comprise software instructions stored on memory 220 and executed by processor(s) 218. TOF sensor device 202 may also interact with other hardware and/or software components not depicted in FIG. 2. For example, processor(s) 216 may interact with one or more external user interface devices, such as a keyboard, a mouse, a display monitor, a touchscreen, or other such interface devices. TOF sensor device 202 may also include network communication components and associated networking ports for sending data generated by any of components 204, 206, 208, 210, 212, and 214 over a network (either or both of a standard data network or a safety network), or over a backplane.

Emitter component 204 can be configured to control emission of light by the TOF sensor device 202. TOF sensor device 202 may comprise a laser or light emitting diode (LED) light source under the control of emitter component 204. Emitter component 204 can generate pulsed light emissions directed to the viewing field, so that time-of-flight information for the reflected light pulses can be generated by the TOF sensor device 202 (e.g., by the distance determination component 208).

Photo-sensor component 206 can be configured to convert light energy incident on a photo-receiver or photo-detector array to electrical energy for respective pixels of a viewing space, and selectively control the storage of the electrical energy in various electrical storage components (e.g., measuring capacitors) for distance analysis. Distance determination component 208 can be configured to determine a propagation time (time of flight) for emitted light pulses for respective pixels of the viewing space based on the stored electrical energy generated by the photo-sensor component 206, and to further determine a distance value of an object or surface corresponding to a pixel within the viewing space based on the determined propagation time.

Intrusion detection component 210 can be configured to analyze distance values corresponding to a selected set of pixels corresponding to a detected object and determine, based on the analysis, whether the distance values indicate that the detected object is within a defined protective field distance. To ensure high probability of object intrusion detection while minimizing the probability of a false intrusion detection, intrusion detection component 210 determines that the object has intruded into the protected zone when a specified minimum number M of the N distance values of the pixel set are less than the defined protection distance, where M is selected to be less than N. Although this general technique is sufficiently robust as to be able to accommodate outlier distance values, some embodiments of intrusion detection component 210 can also be configured to remove outlier distance values from the pixel set and recalibrate the analysis to accommodate the outlier removal. Some embodiments of intrusion detection component 210 can also be configured to perform filtering of the distance values of the pixel set as part of the intrusion detection analysis. For example, intrusion detection component 210 may replace a given distance value by a weighted average of itself with its neighboring pixel distance values to yield an improved, filtered sample set.

The control output component 212 can be configured to control one or more sensor outputs based on results generated by the distance determination component 208 and intrusion detection component 210. This can include, for example, sending an analog or digital control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more plant personnel via a human-machine interface (HMI) or a personal mobile device, sending data over a safety network, or other such signaling actions. In various embodiments, control output component 212 can be configured to interface with a plant network (e.g., a control and information protocol network, and Ethernet/IP network, a safety network, etc.) and send control outputs to other devices over the network connection, or may be configured to send output signals via a direct hardwired connection.

User interface component 214 can be configured to receive user input and to render output to the user in any suitable format (e.g., visual, audio, tactile, etc.). In some embodiments, user interface component 214 can be configured to communicate with a graphical user interface (e.g., a programming or development platform) that executes on a separate hardware device (e.g., a laptop computer, tablet computer, smart phone, etc.) communicatively connected to TOF sensor device 202. In such configurations, user interface component 214 can receive input parameter data entered by the user via the graphical user interface, and deliver output data (e.g., device status, health, or configuration data) to the interface. Input parameter data can include, for example, normalized pulse shape data that can be used as reference data for identification of irregularly shaped pulses, light intensity settings, minimum safe distances or other distance threshold values to be compared with the measured distance value for the purposes of determining when to initiate a control or safety output, pixel set definition information used for intrusion detection analysis, or other such parameters. Output data can comprise, for example, status information for the TOF sensor device 202, alarm or fault information, parameter settings, or other such information.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
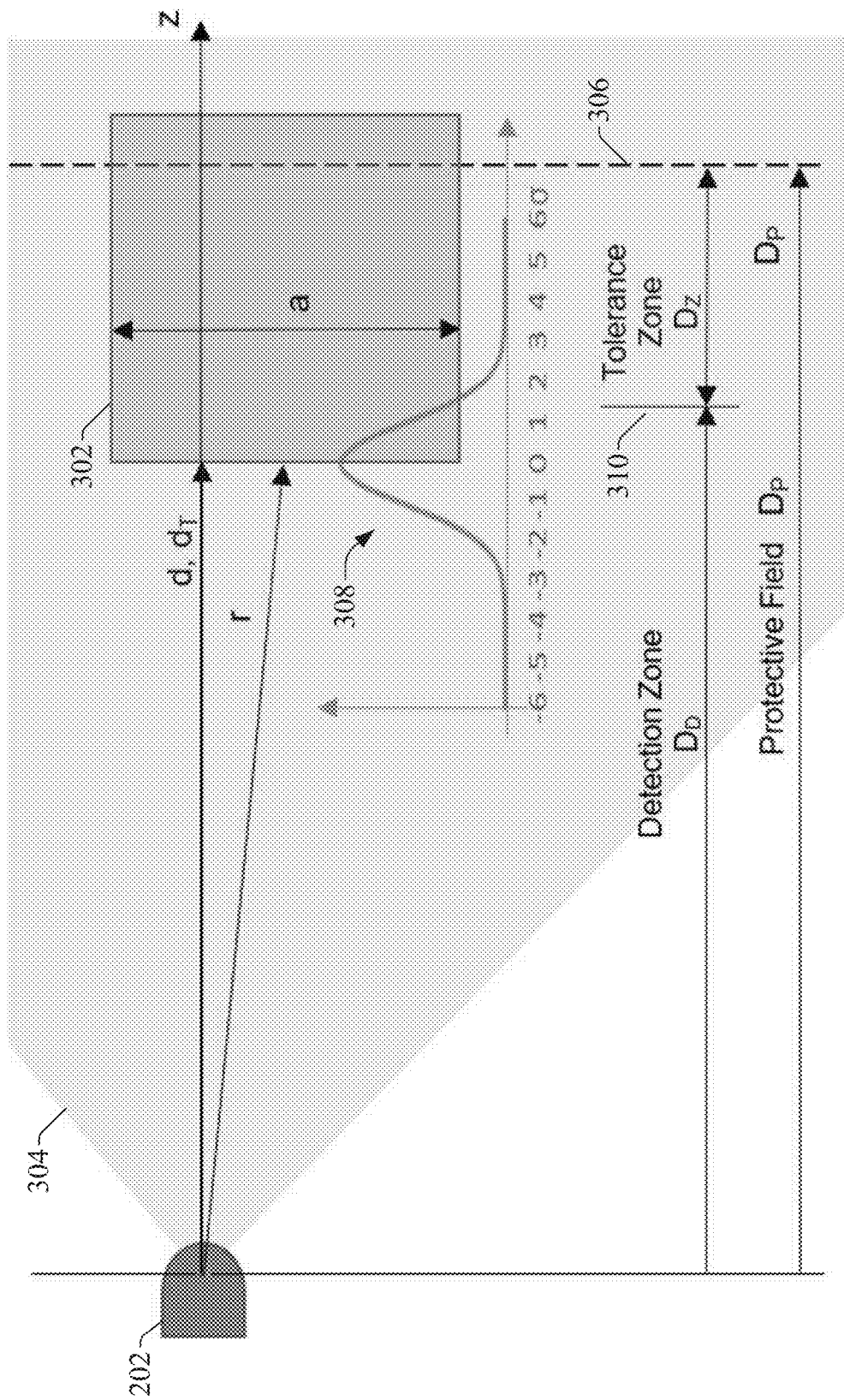
FIG. 3 is a diagram illustrating detection of an example cubical object by embodiments of a TOF sensor device.

FIG. 3 is a diagram illustrating detection of an example cubical object 302 by embodiments of TOF sensor device 202. The emitter component 204 of TOF sensor device 202 emits a series of light pulses into the field of view as beam 304 and the photo-sensor component 206 receives returned light pulses reflected from the field of view, including light pulses reflected from object 302. Distance determination component 208 analyzes the voltage values captured by the photo-sensor component 206 in response to the reflected light pulses incident on the subset of pixels corresponding to object 302 to estimate total propagation times for of the pulses received at the pixels, and translates these propagation times to estimated distances of object 302 from the respective pixels (e.g., based on equation (1) above or a variation thereof).

Figure 4:
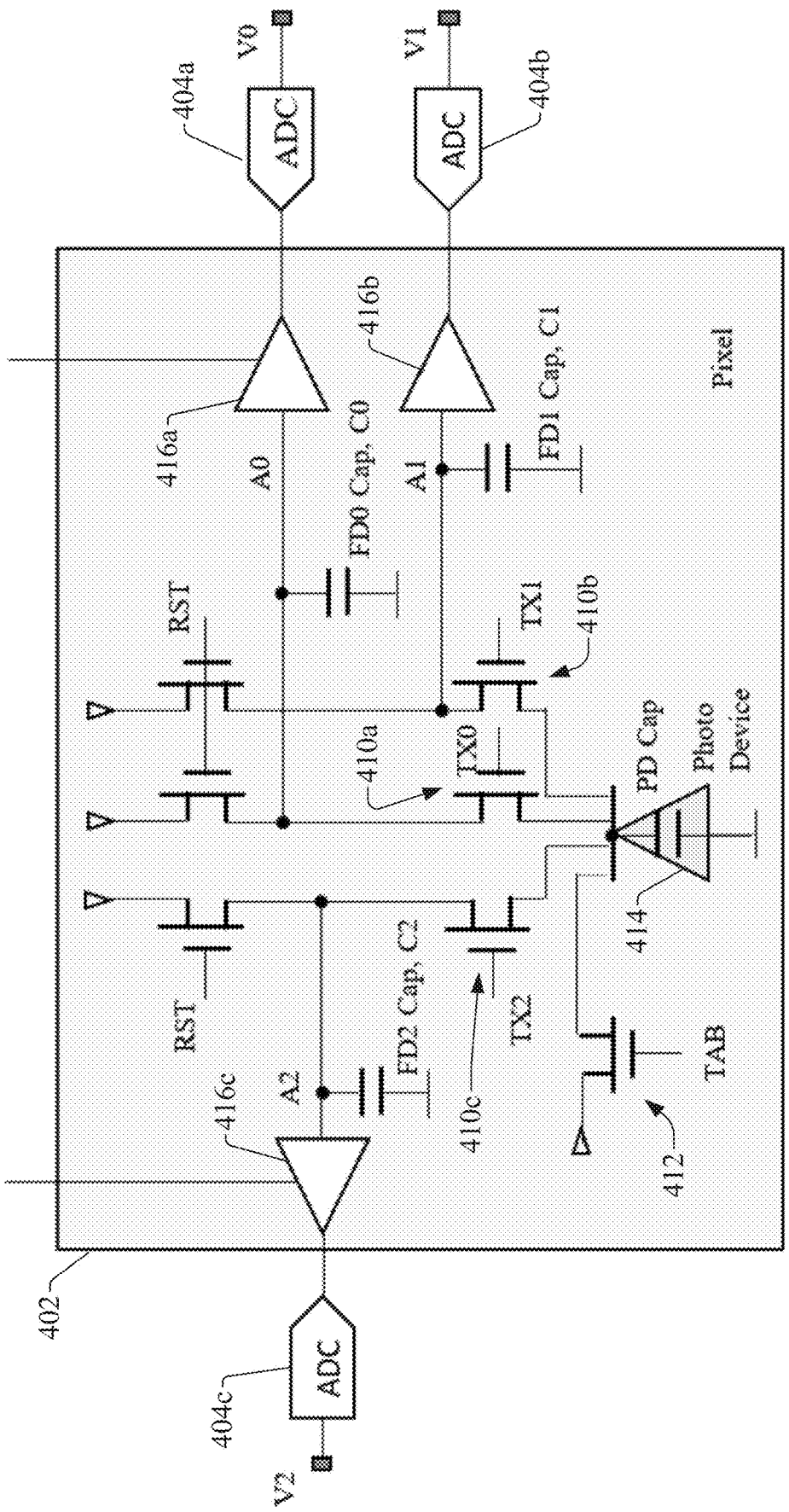
FIG. 4 is a diagram of an example architecture of a photo-detector for embodiments of a TOF sensor device that includes three measuring capacitors.
Figure 5:
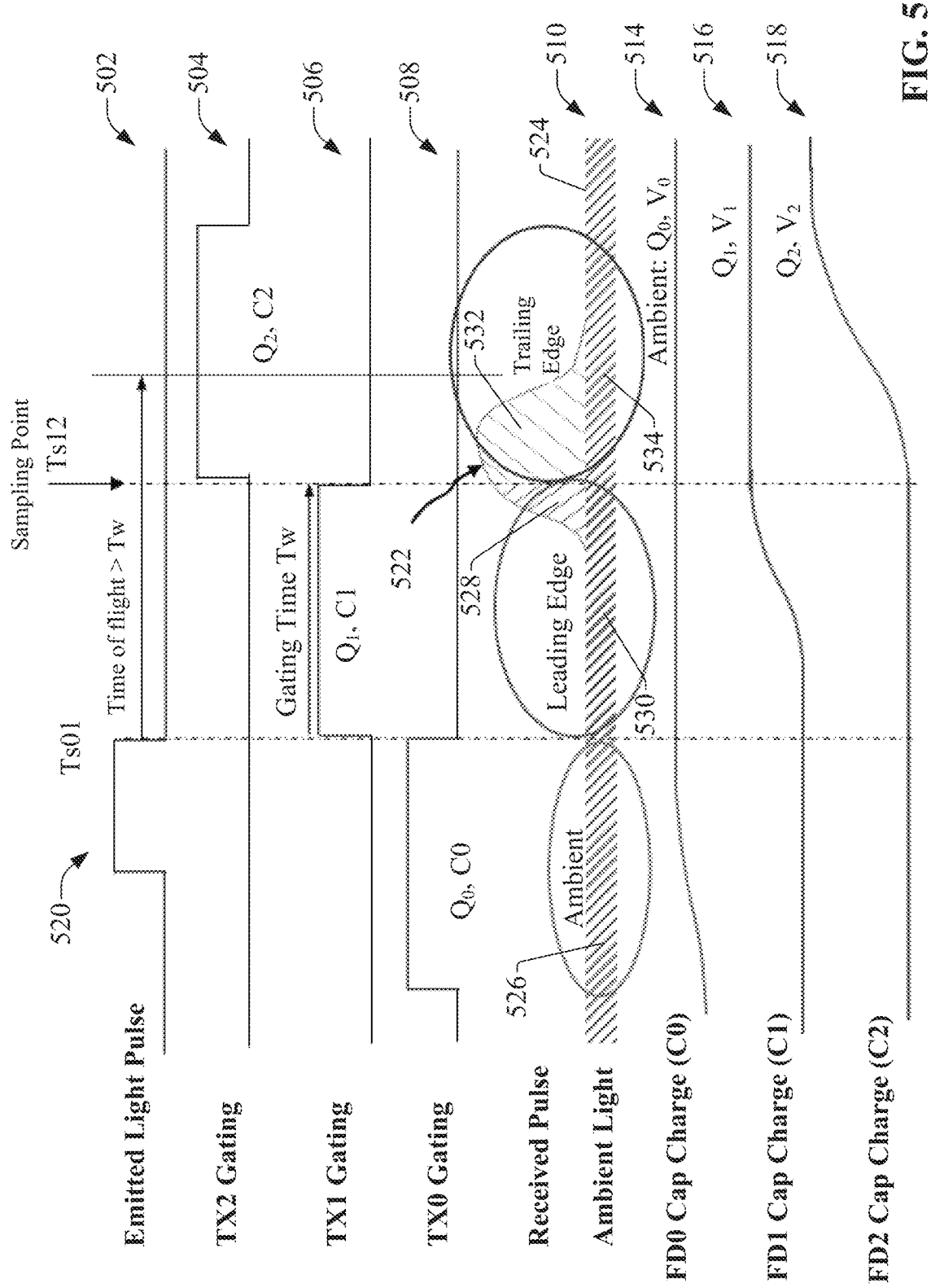
FIG. 5 is a timing diagram illustrating example timings of events associated with operation of a photo-detector for an example pulse period.

One pixel of the TOF sensor device's photo-detector observes a portion of object 302 located in that pixel's field of view and captures the optical energy from a light pulse reflected from the object 302 necessary to calculate the distance of the object. The intrusion detection techniques described herein are not dependent upon the particular technique used by the TOF sensor device 202 to translate incident optical energy into pixel-level distance information for an object in the field of view. FIGS. 4 and 5 illustrate an example, non-limiting architecture and technique for capturing pulse information by a three-capacitor photo-detector corresponding to one pixel. However, other photo-detector architectures and corresponding techniques for capturing pulse information and computing a corresponding distance value for a pixel are also within the scope of one or more embodiments, including architectures that include more or less than three measuring capacitors. In general, the intrusion detection techniques described herein are not dependent upon the technique used by the TOF sensor device for measuring distance values corresponding to respective pixels.

FIG. 4 is a diagram of an example architecture of a photo-detector 402 for some embodiments of TOF sensor device 202 that includes three measuring capacitors C0, C1, and C2. Measuring capacitors C0, C1, and C2 can be floating diffusion capacitors, and are also alternately referred to as FD0, FD1, and FD2, respectively. Photo-detector 402 corresponds to a single pixel of a field of view being monitored by TOF sensor device 202. Photo-detector 402 can be one of an array of photo-detectors 402 that make up a pixel array for the field of view. Although the present example is described in terms of a photo-detector 402, similar techniques can be used to determine time-of-flight distances in other types of photo-sensitive elements, such as photogates.

Example photo-detector 402 includes a photo device 414 (e.g., a photo-diode and a capacitor (PD Cap)) that generates and stores electrical charges when exposed to light, such as pulsed light from a reflected pulse as well as ambient light. The magnitude of the electrical charge is proportional to the intensity of the light incident on the photo device 414. Charges generated by photo device 414 in response to incident light is transferred to one of the measuring capacitors C0, C1, or C2, where the measuring capacitor that receives the charge is determined by the states of control line (or gating) switches 410, which are controlled by gating signals TX0, TX1 and TX2. Specifically, a high gating signal TX0 causes switch 410a to become conductive, which causes the charge generated by the photo device 414 to be transferred to measuring capacitor C0. Similarly, a high gating signal TX1 causes the switch 410b to become conductive, causing the charge generated by the photo device 414 to be transferred to measuring capacitor C1. A high gating signal TX2 causes switch 410c to become conductive, causing the charge generated by photo device 414 to be transferred to measuring capacitor C2. During a measuring sequence, only one of the gating signals TX0, TX1, or TX2 is activated at a given time, and the timing of each gating signal determines when the charges generated by photo device 414 are directed to, and accumulated into, the corresponding measuring capacitor.

During times when none of the gating signals TX0, TX1, or TX2 are active, the TAB gating signal on the TAB switch 412 is set high, which keeps the TAB switch 412 conductive so that any charges generated by the photo device 414 are drained. This keeps the photo device 414 free of charges until measurement information is to be captured. While any of the gating signals TX0, TX1, or TX2 are set high, the gating signal on the TAB switch 412 is set low. Photo-detector 402 also includes three reset switches 418 respectively connected to the three measuring capacitors C0, C1, and C2 and controlled by an RST gating signal. When the RST gating signal is set high, the reset switches 418 become conductive and connect the measuring capacitors C0, C1, and C2 to ground, clearing the charges (and corresponding voltages) stored on the measuring capacitors.

This multi-capacitor architecture allows electrical charge generated by photo device 414 in response to a single received light pulse to be separated (or split) and stored in different measuring capacitors by switching from one active gating signal to another while the pulsed light is illuminating the pixel. The time of transition from one gating signal to another is referred to herein as the split point or sampling point, since this transition time determines where, along the received pulse waveform, the received pulse is divided or split.

FIG. 5 is a timing diagram illustrating example timings of events associated with operation of photo-detector 402 for an example pulse period. Emitted light pulse timing chart 502 represents the timing of the light pulse output modulated by the TOF sensor device's emitter component 204, where the high level of chart 502 represents the time at which the emitter component 204 is emitting a light pulse (e.g., light pulse 520). Received pulse timing chart 510 represents the intensity of light received by the photo device 414, where the rise in the intensity represents the received reflected pulse 522 corresponding to the emitted pulse 520 (although emitted pulse 520 is depicted as substantially rectangular, reflected pulse 522 is shown as non-rectangular and somewhat distorted due to possible imperfections in the reading components). In addition to the reflected pulse 522, timing chart 510 also depicts ambient light received at the photo device 414 as a constant flat line 524 above zero (ambient light is assumed to be substantially constant in this example). As part of the initialization process, the anti-blooming gating signal to the TAB switch 412 has been pulsed prior to the timing shown in FIG. 5 in order to clear the photo device 414 of charges, and the RST gating signal has been pulse to clear any stored charges on the measuring capacitors C0, C1, and C2.

Gating signal timing charts 504, 506, and 508 represent the timings of the TX0, TX1, and TX2 gating signals, respectively. The TX0, TX1, and TX2 gating signals illustrated in FIG. 5 can be controlled by photo-sensor component 206 of TOF sensor device 202. Although FIG. 5 depicts light pulse 520 as being considerably shorter in duration than the durations of the TX0, TX1, and TX3 gating signals, in some implementations the light pulse 520 may have a duration similar to the TX0, TX1, and TX2 gating signals. In the example timing illustrated in FIG. 5, the TX0 gating signal goes high prior to emission of pulse 520, and stays high until a time Ts01, for a total duration or gating time of Tw (the gating integration pulse width). The falling edge of the TX0 gating signal can be set to substantially coincide with the falling edge of the emitted light pulse 520 at time Ts01. While the TX0 control signal is high, the light-driven charges collected by the photo device 414 are transferred to measuring capacitor C0, as shown in the FD0 Cap Charge timing chart 514 by the increasing charge $Q_0$ between the leading edge of the TX0 gating signal and time Ts01. The TX0 gating signal goes low at time Ts01, ending the transfer of charges to measuring capacitor C0 (FD0), and causing the total amount of charge on C0 to level to a value $Q_0$ (corresponding to a voltage $V_0$). In the scenario depicted in FIG. 5, since the TX0 gating signal turns off before reflected pulse 522 is received, charge $Q_0$ (and voltage $V_0$) is representative only of ambient light incident on the photo device 414, represented by the circled shaded region 526 under the received light timing chart 510.

Also at time Ts01, the TX1 gating signal turns on and remains high for the duration of gating time Tw (the same duration as the TX0 gating signal), as shown in the TX1 gating timing chart 506. At the end of the gating time Tw, the TX1 gating signal turns off at time Ts12 (also defined relative to the leading edge of the TX0 gating signal). While the Tx1 gating signal is high, light-driven charges from photo device 414 are transferred to measuring capacitor C1 (FD1) as charge $Q_1$, as shown by the increasing $Q_1$ curve between time Ts01 and Ts12 in timing chart 516 (FD1 Cap Charge).

In this scenario, the time of flight (or propagation time) of the emitted pulse, which is a function of the distance of the object or surface from which the pulse was reflected, is such that the leading edge of reflected pulse 522 is received at the photo device 414 while the TX2 gating signal is on. Consequently, this leading edge 528 of the reflected pulse is captured as a portion of charge $Q_1$ in measuring capacitor C1. Thus, at time Ts12, charge $Q_1$ on measuring capacitor C1 is representative of the leading edge portion (shaded region 528) of reflected pulse 522 as well as any ambient light received at the photo device 414 while the TX1 control signal is high. That is, the amount of charge $Q_1$ (or voltage $V_1$) stored on measuring capacitor C1 is proportional to the shaded region 530 of timing chart 510 (representing the amount of ambient light collected during the duration of the TX1 high signal) plus the shaded region 528 (representing the leading portion of the received pulse 522 without ambient light).

At time Ts12, the TX1 gating signal goes low and the TX2 gating signal goes high, causing the charges from the photo device 414 to begin transferring to the third measuring capacitor C2. The TX2 gating signal is held high for duration Tw (the same gating time used for the TX0 and TX1 gating signals), and is then switched low. The FD2 Cap Charge timing chart 518 illustrates the rise in the accumulated charge on measuring capacitor C2 during this duration. When the TX2 gating signal goes low, the transfer of charge to measuring capacitor C2 ceases, and the amount of charge on C2 levels to a value $Q_2$ (corresponding to voltage $V_2$). Since time Ts12 occurs while reflected pulse 522 is being received in this example scenario, this timing captures the trailing edge portion of the reflected pulse as a portion of charge $Q_2$ on measuring capacitor C2. Thus, charge $Q_2$ represents the trailing edge portion of received pulse 522 (represented by shaded region 532) plus the amount of ambient light collected while the TX2 gating signal was high (represented by shaded region 534).

Using this gating signal timing, and for the pulse time-of-flight represented in FIG. 5, the charges generated by reflected pulse 522 are split between measuring capacitors C1 and C2 at the falling edge of the TX1 gating signal (time Ts12). Time Ts12, corresponding to the falling edge of the TX1 gating signal, is therefore the sampling point in this case. In the scenario depicted in FIG. 5, received pulse 522 has a time of flight delay longer than the gating time Tw. Consequently, the received pulse 522 is not received at the photo-detector 402 until after the TX0 gating signal has gone low, and charge $Q_0$ is representative only of ambient light.

Figure 6:
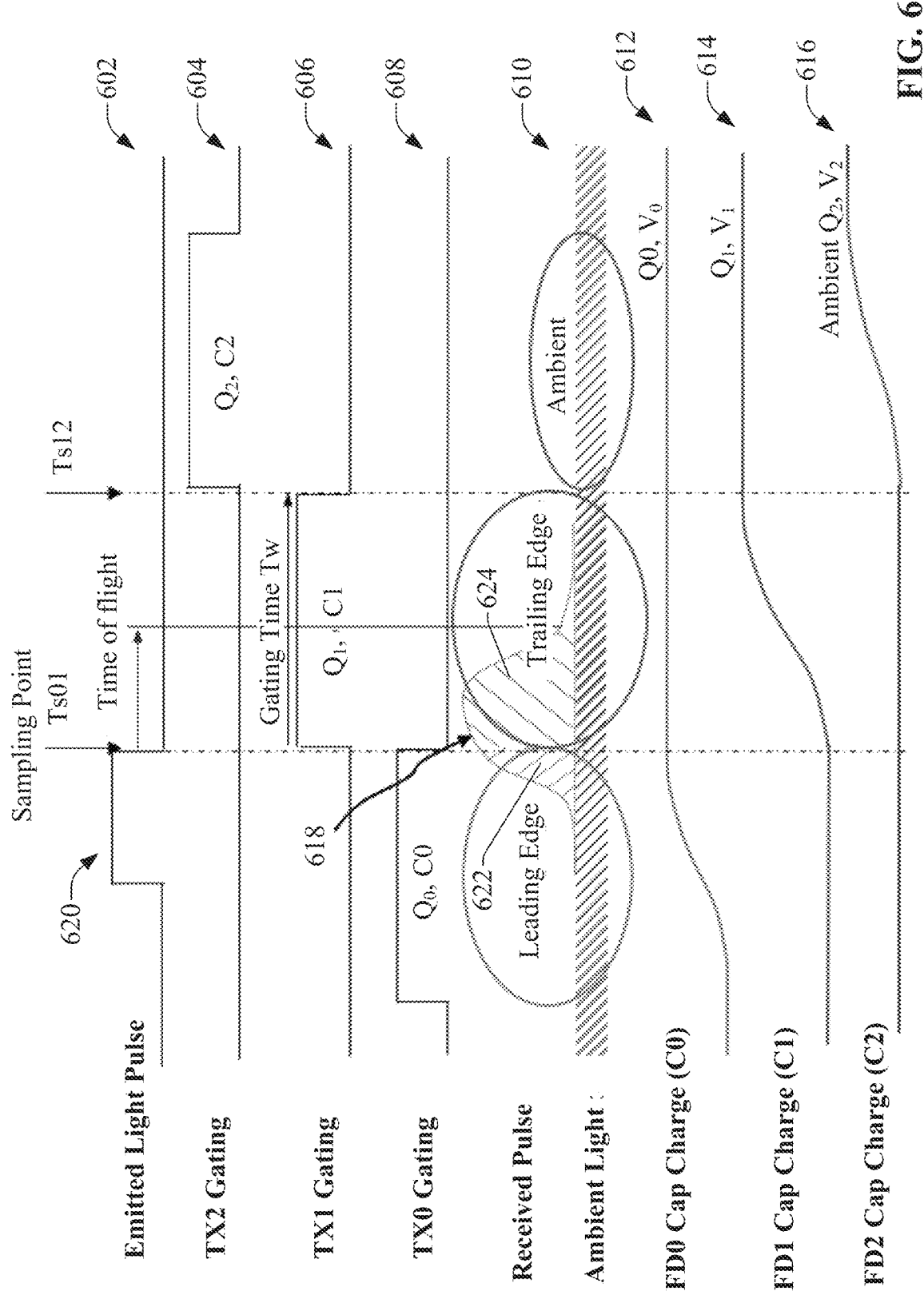
FIG. 6 is another timing diagram illustrating example timings of events associated with operation of a photo-detector for a scenario in which the time of flight for the emitted light pulse is considerably shorter than that of the example scenario of FIG. 5.

FIG. 6 is another timing diagram illustrating example timings of events associated with operation of photo-detector 402, for a scenario in which the time of flight for the emitted light pulse 620 (that is, the time from emission of light pulse 620 to receipt of reflected pulse 618 at photo-detector 402) is considerably shorter than that of light pulse 520 of FIG. 5. As shown in timing charts, 602, 604, 606, and 608, the relative timings of the emission of light pulse 620 and the TX0, TX1, and TX2 gating signals are the same as those depicted in FIG. 5. However, because the total time of flight of the emitted pulse 620 is shorter in this scenario relative to the scenario described above (due to the fact that the object or surface from which the pulse is reflected is closer to the TOF sensor device 202), reflected pulse 618 is received at the TOF sensor device 202 earlier in the pulse cycle relative to reflected pulse 522 shown in FIG. 5.

In contrast to the scenario described above in which the pulse time of flight is longer, in this scenario the reflected pulse 618 is received while the TX0 gating signal is still high. Consequently, the charge $Q_0$ on measuring capacitor C0 is not only representative of ambient light, as in FIG. 5, but rather is representative of ambient light plus the leading edge portion 622 of the reflected pulse. Also, the trailing edge portion 624 of reflected pulse 618 is captured by measuring capacitor C1 (rather than C2 as in FIG. 5), since the trailing edge portion 624 is received while the TX1 gating signal is on. Thus, charge $Q_1$ on measuring capacitor C1 is representative of the trailing edge portion 624 plus ambient light.

As can be seen in the respective timing diagrams of FIGS. 5 and 6, whereas the reflected pulse 522 in FIG. 5 was split (or sampled) at time Ts12, causing the leading and trailing edge portions to be split between measuring capacitors C1 and C2, reflected pulse 618 is split at time Ts01 due to the shorter time of flight, causing the leading and trailing edge portions to be split between measuring capacitors C0 and C1. Since reflected pulse 618 has been fully received and captured prior to initiation of the TX2 gating signal, charge $Q_2$ on measuring capacitor C2 is indicative only of ambient light.

The time within the pulse period at which the received pulse is split is referred to as the sampling point. In the case of pulse cycles in which the pulse has a relatively long time of flight (as in FIG. 5), the sampling point will be Ts12, whereas pulse cycles with a relatively short time of flight (as in FIG. 6) will have a sampling point at Ts01. To ensure that the received pulse has only one sampling point, the gating time Tw can be set to be approximately equal to the expected duration between the leading edge and trailing edge of the received pulse (the pulse width $T_0$), to ensure that the pulse is split by only one of the two possible sampling points Ts01 or Ts12, and that the received pulse is unlikely to fall between the sampling times without being split. As illustrated by FIGS. 5 and 6, interpretation of the data stored on each measuring capacitor C0, C1, and C2 changes depending on the sampling point. Specifically, if Ts01 is the sampling point, measuring capacitor C2 records only ambient light, measuring capacitor C0 records ambient light plus the leading edge portion of the received (reflected) pulse, and measuring capacitor C1 records ambient light plus the trailing edge portion of the received pulse. If Ts12 is the sampling point, measuring capacitor C0 records ambient light only, measuring capacitor C1 records ambient light plus the leading edge portion of the received pulse, and measuring capacitor C2 records ambient light plus the trailing edge portion of the pulse.

In some embodiments, TOF sensor device 202 can repeat the pulse period—comprising the sequence depicted in FIG. 5 or FIG. 6—multiple times within a single measuring sequence as a burst sequence, and the charges accumulated over the multiple pulse periods can be transferred to and collected by the measuring capacitors. Repeating the pulse period multiple times within a single measuring sequence can ensure that the measuring capacitors accumulate and collect a measurable amount of charge.

Once charges $Q_0$, $Q_2$, and $Q_3$ have been accumulated in their respective measuring capacitors for a given pulse sequence, the corresponding voltages $V_0$, $V_2$, and $V_3$ can be measured from the respective three measuring capacitors C0, C1, and C2. Distance determination component 208 of TOF sensor device 202 can then identify the sampling point using any suitable identification technique; e.g., based on a comparison of the charge or voltage values on the measuring capacitors. If the sampling point is Ts12, distance determination component 208 can compute the propagation time can be determined based on the following formula:

$$t_p = \frac{V_2 - V_0}{V_1 + V_2 - 2 \cdot V_0} T_0 + T_{s12} \quad (2)$$

Alternatively, if the sampling point is Ts01, distance determination component 208 can compute the propagation time can be determined based on the following formula:

$$t_p = \frac{V_1 - V_2}{V_0 + V_1 - 2 \cdot V_2} T_0 + T_{s01} \quad (3)$$

In either case, distance determination component 208 can then convert the propagation time to a distance value for the pixel (e.g., using equation (1) and substituting time t with the propagation time).

It is to be appreciated that this technique for determining the distance of an object by a photo-detector of a given pixel is only intended to be exemplary, and that the techniques described below for identifying an intrusion of an object or person into a protected zone given an array of pixel-level distance values can be used in TOF sensor devices that employ other techniques for generating point cloud data for an image. That is, the intrusion detection techniques described below are not dependent on a specific technique for measuring the distance values that make up the point cloud data for an image.

Returning now to FIG. 3, TOF sensor device 202 performs intrusion detection by comparing a measured distance d of object 302 with a defined threshold distance $D_P$ representing the limit of the protective field (the protected area) being monitored by the sensor device 302. Threshold distance $D_P$ can be configured by a user (e.g., via user interface component 214) based on the needs of the safety application within which TOF sensor device is being used. For example, threshold distance $D_P$ can be set to correspond to a determined minimum safe distance from a hazardous machine or area. When TOF sensor device 202 determines that the distance d of object 302 is less than the threshold distance $D_P$ (that is, when d<$D_P$), the object 302 determined to be within the protective field. In some applications, in response to detection of an object within the protective field (that is, when the measured distance d is determined to be less than the distance $D_P$ of the protective field boundary), the control output component 212 can initiate a defined safety action to place the protected area in a safe state (e.g., by disconnecting power to a hazardous machine, by placing the machine in a safe operating mode, etc.).

In FIG. 3, variable d represents the measured distance of object 302 determined by TOF sensor device 202, while $d_T$ represents the true distance of object 302 from the TOF sensor device 202. The limit or boundary of the protective field is defined as a plane 306 perpendicular to the central sensing axis z of the sensor device 202, and the distance of that boundary plane 306 to the sensor is $D_P$. An object is inside the protective field if its true distance $d_T$ is smaller than the threshold distance $D_P$. In the example scenario depicted in FIG. 3, the distance of a point to the TOF sensor device 202 is defined as a point coordinate on the z-axis, which is different than point-to-point distance, such as radial distance r.

The distance $D_P$ of the protective field can be viewed as the sum of a detection zone distance $D_D$ and a tolerance zone distance $D_Z$. With the detection criterion being defined as $d<D_P$, the probability of detection must be guaranteed if the object 302 is at the boundary of the detection zone—located at a distance $D_D$ from the TOF sensor device 202—or intruding somewhat into the detection zone. That is, detection of intrusion of object 302 should be guaranteed when the following condition is true:

$$d_T < (D_D - D_I) \quad (4)$$

where $D_I$ is a small intrusion distance smaller than the minimum size (a) of object 302.

Also included in FIG. 3 is a probability distribution curve 308 of the measured distance d of the object 302. The tolerance zone, represented by the distance $D_z$ between the detection zone boundary 310 and the protective field boundary plane 306, is set to guarantee high probability of detection, such that that the measured distance d is unlikely to be greater than $D_P = (D_D + D_z)$ for an object 302 located in the field (that is, when the true object distance $d_T$ is less than or equal to $(D_D - D_I)$, the measured distance d should not indicate that the object 302 is outside the protective field). As an example of a normal distribution of the measured distance, a value of the tolerance zone distance $D_Z$ greater than $5\sigma$ guarantees, for $d_T = <D_D$, a measured distance d smaller than $D_P$ with a probability above a required level of $1-2.9 \cdot 10^{-7}$.

Multiple measurements of the object's distance d can be obtained using a fine spatial scanning resolution in x and y directions (e.g., a laser scanner that implements small sampling distance intervals, a multi-pixel photo detector with angular field of view, or a system comprising a large number of photo detector pixels that each cover a small field of view), providing multiple data points from the surface of the object 302 to be measured and detected. Such multiple distance data points are sometimes combined as an average, or more generally are filtered to provide a more precise, less noisy distance value. The averaged or otherwise improved distance value can then be compared to the threshold $D_P$ representing the boundary of the protective field.

As an alternative to merely filtering the samples, one or more embodiments of the TOF sensor device described herein can compare individual pixel measurements for a set of N pixels against a threshold and determine whether the object is within the protective field based on how many of the N measurements satisfy defined criteria indicative of intrusion of the object into the protective field. In an example technique, when an object is detected by the TOF sensor device 202, a set of N pixels corresponding to a subset of all pixels corresponding to the object are selected, and the N distance measurements corresponding to the N pixels are compared to the threshold distance $D_P$. If at least a defined number M of the N pixels are less than the threshold distance $D_P$ (that is, $d<D_P$) then the object is determined to be inside the protective field. This type of analysis is referred to herein as M-out-of-N analysis.

In some embodiments, each of the N distance measurements can be compared against the same defined distance threshold $D_P$. Alternatively, in some embodiments, each of the N selected pixels can be associated with its own individually configurable distance threshold, resulting in a matrix of thresholds. The size of the sample set can be selected based on a number of variables, including but not limited to a size of the detected object (e.g., the number of pixels N comprising the window can be set to be a fixed percentage of the total number of pixels that correspond to the object). In some embodiments, the set of N pixels can be selected according to a moving window of pixels having a fixed size (e.g., a 4×4 square, yielding a set of N pixels where N=16). The number M representing the number of pixels of the N-pixel set that must satisfy the intrusion criteria can be selected to balance a high probability of detection and a low probability of false alerts, based on the needs of the sensing application in which the TOF sensor device 202 is used. In an example configuration, N may be 16 and M may be set to 9, such that the object is determined to be within the protective field of at least 9 out of the 16 distance measurements satisfy the intrusion criteria. Also, in some embodiments, the size of the sample set can be increased by taking distance measurements at different times according to a defined sampling period.

Figure 7:
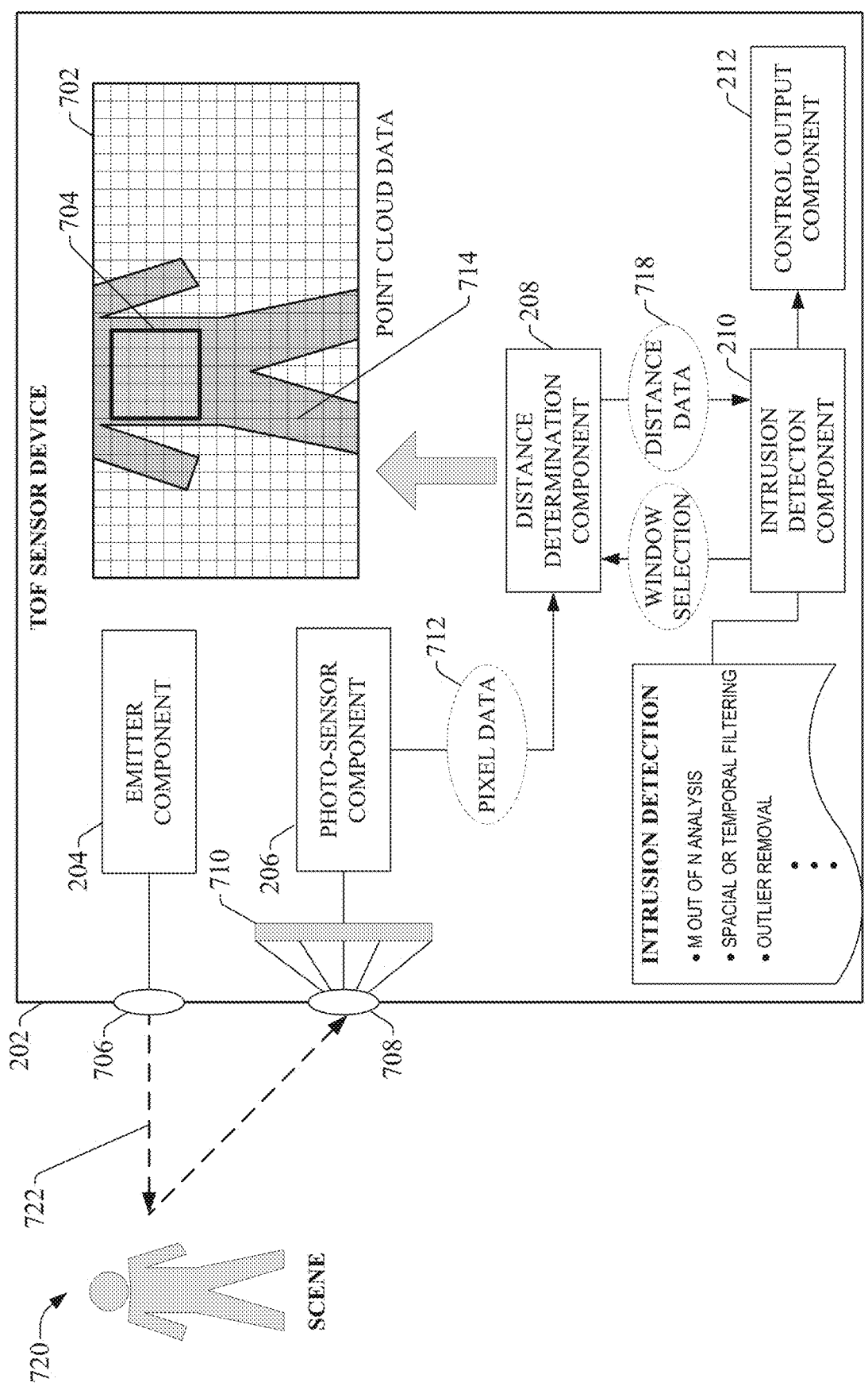
FIG. 7 is a block diagram illustrating components of an example TOF sensor device.

FIG. 7 is a block diagram illustrating components of TOF sensor device 202 according to one or more embodiments. In this example implementation, emitter component 204 emits a pulsed light beam 722 to a scene (e.g., via emitting lens element 706). As described above in connection with FIGS. 4-6, light pulses are reflected from the objects and surfaces within the scene, and the reflected light is received at a receiving lens element 708 and directed to a photo-receiver array 710 associated with photo-sensor component 206, which generates pixel data 712 for the scene. For embodiments that use the example three-capacitor photo-detector 402 described above, pixel data 712 can comprise a set of three measured voltage values $V_0$, $V_1$, and $V_2$ for each pixel of the scene, the three measured voltage values corresponding to measured ambient light, a leading edge portion of a received pulse, and a trailing edge portion of the received pulse (the three voltages $V_0$, $V_1$, and $V_2$ can also be obtained by other types of photo-detectors that employ only a single measuring capacitor per photo-detector using three separate measuring cycles per measuring sequence in order to obtain three voltage values proportional to the leading edge portion, trailing edge portion, and ambient light). The pixel data 712 is provided to distance determination component 208, which computes distance values for each pixel of the resulting image based on the pixel data 712 (e.g., based on equations (1), (2), and/or (3), or variations thereof), resulting in distance data 718. This results in a point cloud 702 for the image, which represents the array of measured distance values corresponding to the array of pixels that make up the image. The distance value of a given pixel represents a distance of an object or surface corresponding to that pixel from the TOF sensor device 202. The distance values for all pixels of the image yields the point cloud 702 for the image. The point cloud distances are provided to intrusion detection component as distance data 718.

The TOF sensor device example depicted in FIG. 7 includes both the distance determination component 208 and the intrusion detection component 210, and distance determination component 208 is configured to calculate pixel-wise distance values based on the measured pixel data 712 (e.g., measuring capacitor voltages) received from the photo-sensor component 206. However, in some embodiments in which the intrusion detection features are implemented on a separate system or sub-system from that which performs the distance measurements, the distance determination component 208 can be configured to receive, as the pixel data 712, point cloud data comprising pixel-wise distance values that have already been calculated by a separate distance measurement system, rather than receiving measured voltage values requiring conversion into distance values. In such embodiments, distance determination component 208 can be configured to retrieve the necessary distance values of interest from this point cloud data, or to refine the distance values (e.g., by combining, fusing, filtering, or otherwise processing the distance values), without the need to convert the pixel data 712 into distance values.

In the illustrated example, person 720 is within the field of view of the TOF sensor device 202, and may be either within the defined protective field or outside the protective field. To determine whether person 720 is within the protective field, intrusion detection component 210 selects a pixel set 704 corresponding to at least a portion of the detected person 720. Pixel set 704 comprises a set of N pixels located within the boundaries of the larger set of pixels 714 corresponding to the detected person 720. In the example illustrated in FIG. 7, the N-pixel set 704 is a 5×5 square set of pixels (N=25). In various embodiments, intrusion detection component 210 can be configured to select the pixel set 704 using any suitable selection technique. For example, some embodiments of intrusion detection component 210 can be configured to select, from the larger set of pixels 714 corresponding to a detected person or object, a square or rectangular matrix having defined x and y dimensions yielding a defined set of N pixels. Alternatively, other shapes for pixel set 704 can be defined, including but not limited to disk-shaped pixel sets within the larger set of pixels. In some embodiments, intrusion detection component 210 can be configured to dynamically select a size of the pixel set 704 based on a detected size of the detected object. For example, intrusion detection component 210 may be configured to select a size of the pixel set 704 that is a defined percentage of the number of pixels that comprise the detected object (that is, the size of pixel set 704 is a fixed percentage of the number of pixels 714 corresponding to person 720).

Also, although the examples described herein consider a distance values captured for the pixel set 704 at a given moment in time corresponding to a present measuring cycle, some embodiments may be configured to process time-based samples, whereby multiple distance values are captured for the pixel set 704 at different points in time within a single measuring cycle, and these multiple time-series sets of distance values can be combined prior to performing the M-out-of-N intrusion detection analysis described below.

Figure 8:
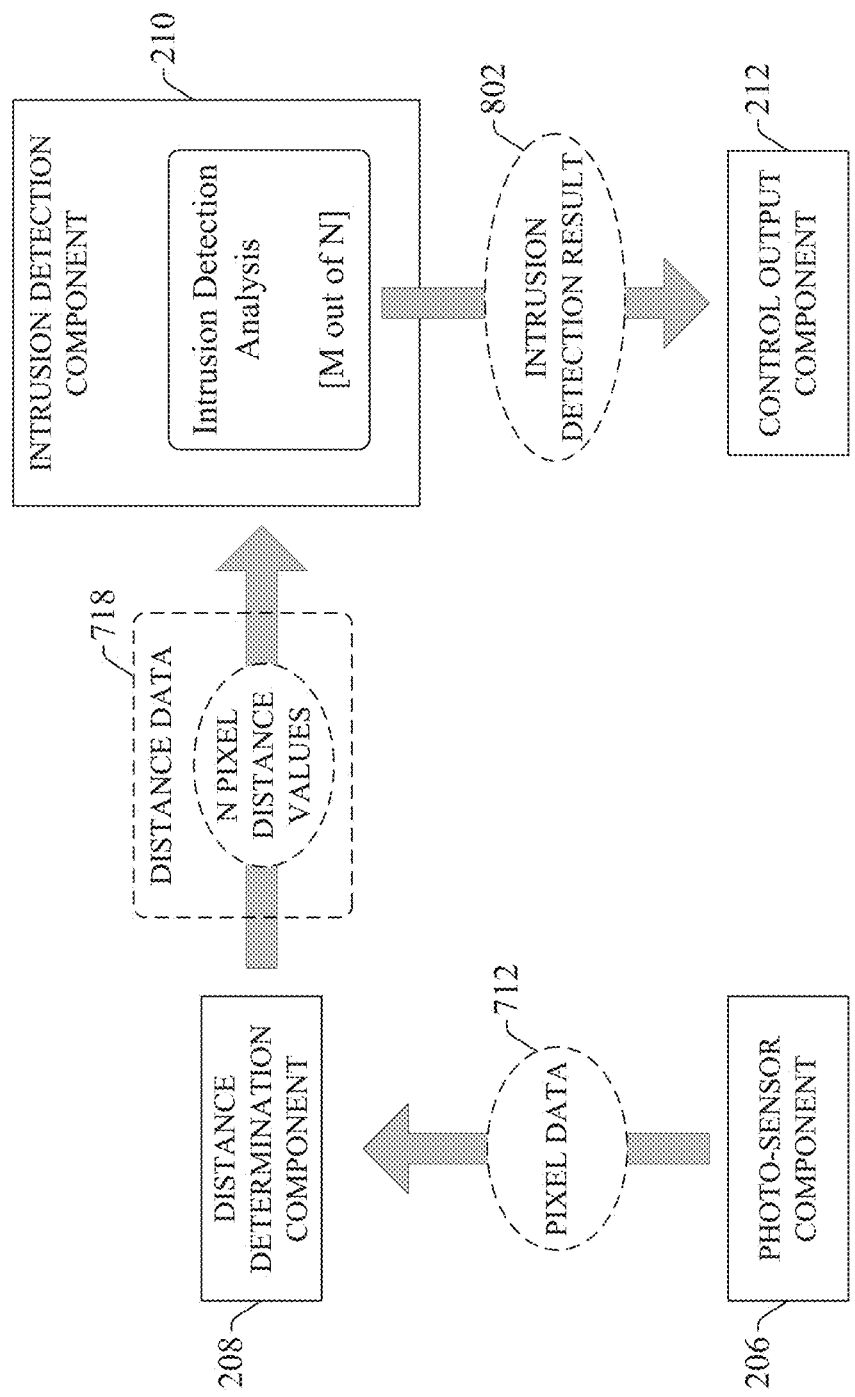
FIG. 8 is a diagram illustrating a generalized data flow implemented by components of a TOF sensor device.

FIG. 8 is a diagram illustrating a generalized data flow implemented by components of TOF sensor device 202 according to one or more embodiments. As noted above, distance determination component 208 provides distance data 718 to intrusion detection component 210, where the distance data 718 comprises N distance values respectively corresponding to the N selected pixels of pixel set 704. Intrusion detection component 210 then performs intrusion detection analysis on the distance data 718 to determine whether the detected object or person (e.g., person 720) is within the protective field. To make this determination, intrusion detection component 210 analyzes each of the N distance values individually to determine which distance values, if any, satisfy a defined intrusion detection criterion. In this example, the intrusion detection criterion is satisfied if the distance value is less than the threshold distance $D_P$ (which can be set by the user via user interface component 214). Other alternative or additional detection criteria can also be defined in one or more embodiments. Intrusion detection component 210 then determines how many of the N distance values satisfy the intrusion criterion. The number of the N distance values satisfying the intrusion criterion is given by the integer K. If the number K of distance values satisfying the intrusion criterion exceeds a defined number M (less than N), intrusion detection component 210 determines that the object or person is within the protective field and provides this detection result to control output component 212 as intrusion detection result 802. If the number K of distance values satisfying the intrusion criterion does not exceed the defined number M, the person or object is determined to be outside the protective field.

Figure 9:
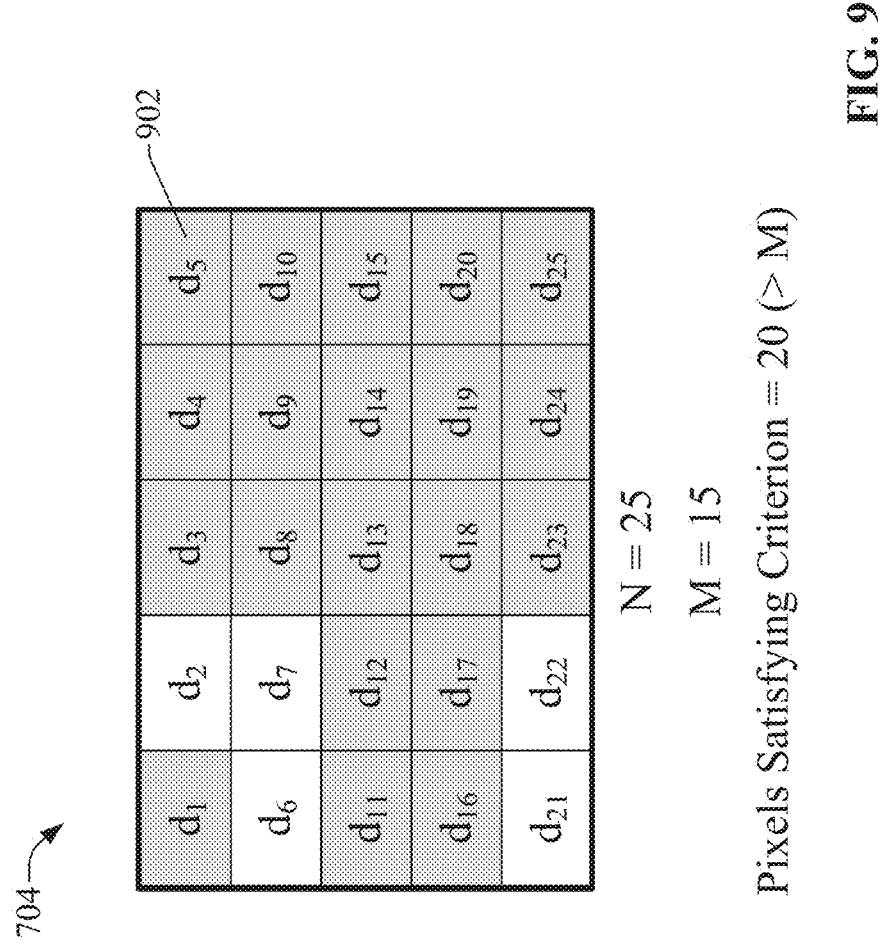
FIG. 9 is a diagram representing a 5×5 pixel set for an example measuring cycle.

FIG. 9 is a diagram representing the 5×5 pixel set 704 depicted in FIG. 7 for an example measuring cycle. At the conclusion of each intrusion measurement cycle, each pixel 902 of the pixel set 704 will have a corresponding distance value $d_x$ where x is a pixel index or pointer ranging from 1 to N (N=25 in the illustrated example). The darkened pixels of the pixel set 704 represent the pixels whose distance value satisfies the intrusion criterion for an example measurement scenario; that is, the pixels whose distances $d_x$ are determined by the intrusion detection component 210 to be less than the threshold distance $D_P$. The white pixels of the pixel set 704 represent the pixels whose distances $d_x$ do not satisfy the intrusion criterion; that is, the pixels whose measured distances $d_x$ are determined by the intrusion detection component 210 to exceed the threshold distance $D_P$. In the example measurement scenario depicted in FIG. 9, 20 out of the 25 pixels of pixel set 704 satisfy the intrusion criterion (that is, 20 pixels have corresponding distances that are less than the threshold distance $D_P$). Since M in this example is set to 15, and the number of pixels satisfying the detection criterion (20) is greater than M (20>15), intrusion detection component 210 determines that the person or object corresponding to the pixel set 704 is within the protective field, and signals to the control output component 212 that a safety action must be initiated.

When multiple distance samples are independent from one another, the probability $P_{total}$ of a true statement on the set of N pixels can be derived from the individual probability $p_0$ of a true statement on each sample, according to:

$$P = \sum_{k=M}^{N} \frac{N!}{k! \cdot (N-k)!} p_0^k (1-p_0)^{N-k} \quad (5)$$

where P is the probability that at least M samples out of N independent samples are true. It can be demonstrated that P is a much higher value than the individual probability $p_0$. For example, for a configuration in which N=25, M=15, and $p_0$=0.95, the probabilities listed in Table 1 below are observed:

TABLE 1

| | |
|---|---|
| P(15 samples true) | 1.478894376461922e−07 |
| P(16 samples true) | 1.756187072048530e−06 |
| P(17 samples true) | 1.766517584237050e−05 |
| P(18 samples true) | 1.491725960022396e−04 |
| P(19 samples true) | 0.001044208172016 |
| P(20 samples true) | 0.005951986580489 |
| P(21 samples true) | 0.026925653578404 |
| P(22 samples true) | 0.093015894179942 |
| P(23 samples true) | 0.230517650793768 |
| P(24 samples true) | 0.364986280423466 |
| P(25 samples true) | 0.277389573121834 |
| P(at least 15 samples true) | Σ = 0.999999988698273 (=1−1.13*10⁻⁸) |

By sampling multiple pixels, the probability of correct intrusion detection is improved relative to an individual probability of detection based on a single sample. For example, whereas the probability of accurate intrusion detection based on a single sample (a single distance value from one pixel) is $p_0$=95%, the probability of detection using 25 samples and a detection criterion of 15 (or more) out of the 25 samples indicating detection yields a detection probability as high as $P=1-1.13*10^{-8}$.

Figure 10:
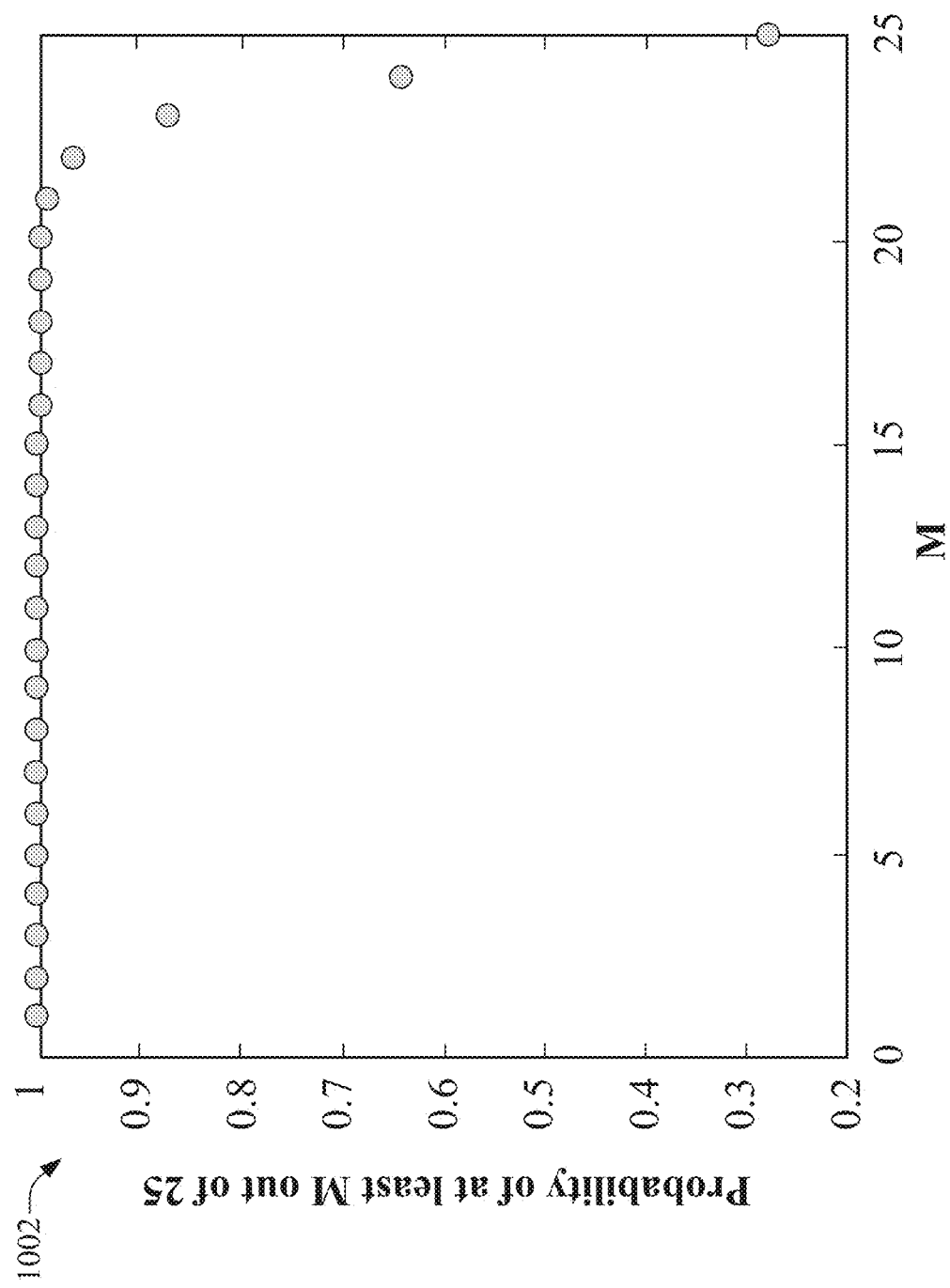
FIG. 10 is a graph that plots intrusion detection probability as a function of M for a scenario in which a pixel set comprises 25 pixels and individual detection probability is $p_0$ is 95%.

The boost probability of object detection $P_d$ to a high number P from a given individual probability $p_0$ depends on the parameters M and N. In general, for a fixed number of pixels N of pixel set 704, the smaller the value of M, the higher the detection probability P using this technique (that is, P becomes closer to 1 as M is reduced). However, the probability of false detections also increase as M is reduced. FIG. 10 is a graph that plots intrusion detection probability as a function of M for a scenario in which pixel set 704 comprises 25 pixels (N=25) and individual detection probability is $p_0$ is 95%. For the sake of increasing the probability $P_d$ of accurate intrusion detection, smaller values of M are preferred. However, the probability of false detections also increase as M is reduced. Therefore, a balance between M and N can be chosen for a given detection application to yield a high probability $P_d$ of intrusion detection (a probability close to 1) while keeping the probability of false alerts low (close to 0).

A false alert occurs when an object is outside the tolerance zone, but due to measurement noise, the measured distance of the object is smaller than the threshold distance $D_P$, causing the TOF sensor to falsely identify the object as being inside the protective area and therefore in danger. The probability $p_{0fa}$ of a false alert for an object just outside the tolerance zone based on a single distance sample (that is, a single distance measurement for one pixel) is 50%. The relation between a single sample being true and a set of samples being true is still defined by equation (5). Using $p_{0fa}$=50%, M=15 and N=25, equation (5) yields a probability of a false alert of $P_{fa}$=21% which is improved relative to using a single distance sample but may still be too high for some detection applications.

Figure 11:
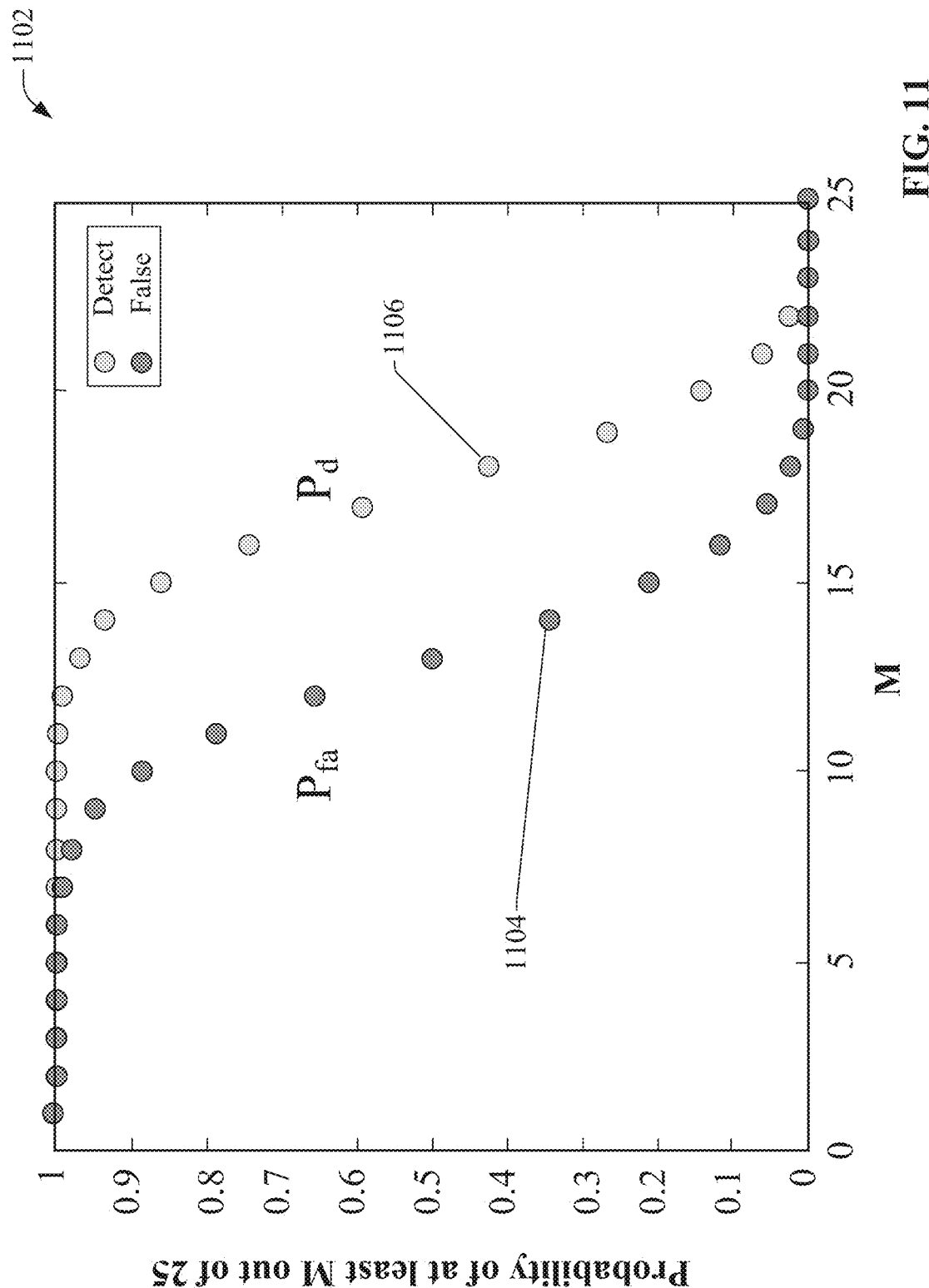
FIG. 11 is a graph plotting both the probability $P_d$ of accurate intrusion detection and the probability $P_{fa}$ of false alerts as a function of M for a scenario in which N=25 and $p_{0fa}$=50%.

FIG. 11 is a graph 1102 plotting both the probability $P_d$ of accurate intrusion detection (curve 1106) and the probability $P_{fa}$ of false alerts (curve 1104) as a function of M, for a scenario in which N=25 and $p_{0fa}$=50%. Similar to plot 1002 shown in FIG. 11, the probability of a false alert $P_{fa}$ decreases as M is increased, as illustrated by the false alert curve 1104. Consequently, a larger M is preferred for the sake of suppressing false alerts.

To achieve a high probability $P_d$ of detection a relatively low value of M is required. However, to achieve low probability $P_{fa}$ of false alarm a relatively high value of M is required. To achieve a suitable balance between accurate detection probability and low probability of false alerts, M can be set to a highest value that still yields a detection probability $P_d$ satisfying the requirements of the detection application in which the TOF sensor device 202 is being used. At this point the probability $P_d$ of detection is guaranteed and the probability $P_{fa}$ of a false alert is as low as possible.

In some embodiments, TOF sensor device 202 can allow a user to explicitly set both the pixel set size N and the intrusion detection sample threshold M (via user interface component 214). In other embodiments, TOF sensor device 202 can allow the user to select a desired intrusion detection probability $P_d$, and use equation (5) (or another probability algorithm that defines an intrusion detection probability as a function of M and N) to determine suitable values of one or both of N and M that will achieve the desired probability; e.g., by substituting the desired detection probability $P_d$ for P and selecting suitable values of N and/or M that achieve the desired detection probability $P_d$. Some embodiments of TOF sensor device 202 can also allow the user to enter other constraints specific to the sensing application in which the TOF sensor device 202 will be used that may dictate appropriate values of N and/or M (e.g., a distance range of the protective field, an expected size of objects to be detected, etc.), and TOF sensor device will set suitable values of N and/or M based on the constraints. In yet other embodiments, intrusion detection component can be configured to dynamically select a size N for the pixel window as a percentage of the size of the detected object, and to select a suitable value of M based on this dynamically selected value of N to achieve a predefined detection probability (e.g., based on equation (5) or another formula that selects a suitable value of M for a given N that achieves at least a minimum probability of detection).

For applications in which there is no value of M that meets both $P_d$ and $P_{fa}$ requirements for a given N-pixel pixel set 704, individual probability $p_0$ of detection can be increased or individual probability $p_{0fa}$ of a false alert can be decreased so that a suitable value of M satisfying the application requirements can be obtained. To increase $p_0$, either the tolerance zone can be increased in length or the sensing precision for one sample can be improved to achieve higher probability of detection. Since larger tolerance zones are typically not preferred, techniques for improve sensing precision are examined.

In the examples described above, intrusion detection component 210 compared each distance value $d_x$ of the pixel set with the same threshold distance $D_P$. However, in some embodiments intrusion detection component 210 can be configured to associate selected threshold distances $D_P$ to respective individual pixels of the sensor device's field of view. For example, for a scenario in which the entire field of view of the sensor device 202 comprises a H×V array of pixels (where H is the number of horizontal pixels and V is the number of vertical pixels), the designer may only be interested in monitoring for protective field intrusions within a particular section of this H×V field of view, where the section is smaller than the total H×V field of view. Accordingly, sensor device 202 can allow the user to selectively associate a threshold distance $D_P$ with pixels corresponding to areas of the field of view that are to be monitored for intrusions, while assigning no threshold distance $D_P$ (or a threshold distance of 0) to those pixels corresponding to areas of the field of view that do not require intrusion detection. Moreover, since the sensor device 202 allows the user to set threshold distances $D_P$ individually for each pixel, different areas of the field of view can be associated with different threshold distances. When an object or person is detected within the field of view and the pixel set 704 of suitable size is defined, the distances of each pixel of the pixel set 704 is compared with the particular threshold distance $D_P$ defined for that pixel for the purposes of intrusion detection analysis.

Also, in some embodiments, intrusion detection component 208 can be configured to carry out the M-out-of-N process multiple times for a given intrusion detection measuring sequence in order to improve detection. In some such embodiments, the intrusion detection component 208 can be configured to perform multiple iterations of the M-out-of-N measurement, changing the size of the pixel set 704 for each iteration (as well as the values of N and M). For example, in a first iteration the intrusion detection component 208 can set the size of the pixel set 704 to be a first size (e.g., 4×4), yielding an N value of 16 pixels. For a second iteration, the pixel set 704 can be increased to a second size (e.g., 5×5), yielding an N value of 25 pixels, and for a third iteration the size of the pixel set may be further increased to a third size (e.g., 6×6) to yield an N value of 36. When the N value is increased between iterations, the corresponding M number may also be increased as needed to maintain a desired detection probability. Any number of iterations can be performed, with the size of the pixel set 704 either staying the same or increasing between iterations. For each iteration, the M-out-of-N analysis is performed using the values of N and M designated for that iteration. Upon completion of all iterations, intrusion detection component 210 can aggregate the results of all iterations in any suitable manner to determine whether the object or person is within the protective field. For example, intrusion detection component 210 may determine that the object or person is within the protective field if a majority of the iterations indicate that the object has intruded (that is, that at least M out of N distance values are within the distance threshold $D_p$). This technique of performing multiple iterations of M-out-of-N analysis on a detected object can yield improved detection reliability, particularly for large objects having irregular shapes.

Also, in some embodiments, intrusion detection component 208 can be configured to carry out the M-out-of-N process multiple times for a given intrusion detection measuring sequence such that the N-pixel pixel set 704 is moved to a different location for each iteration. In such embodiments the window of N pixels comprising pixel set 704 can be moved incrementally across the field of view, either one pixel at a time or multiple pixels at a time in either the x direction or y direction. In some such embodiments, sensor device 702 may omit the step of first identifying an object within the field of view prior to determining a size and location for the window of N pixels. Instead, the N-pixel window may sweep the entire field of view, performing the M-out-of-N analysis at multiple locations as the pixel window sweeps the field of view. If any of the capture cycles during this sweep determine that the number of the N pixels that are within the threshold distance exceeds M (K>M), the sensor device 202 determines that an object or person has intruded within the protective field.

Figure 12:
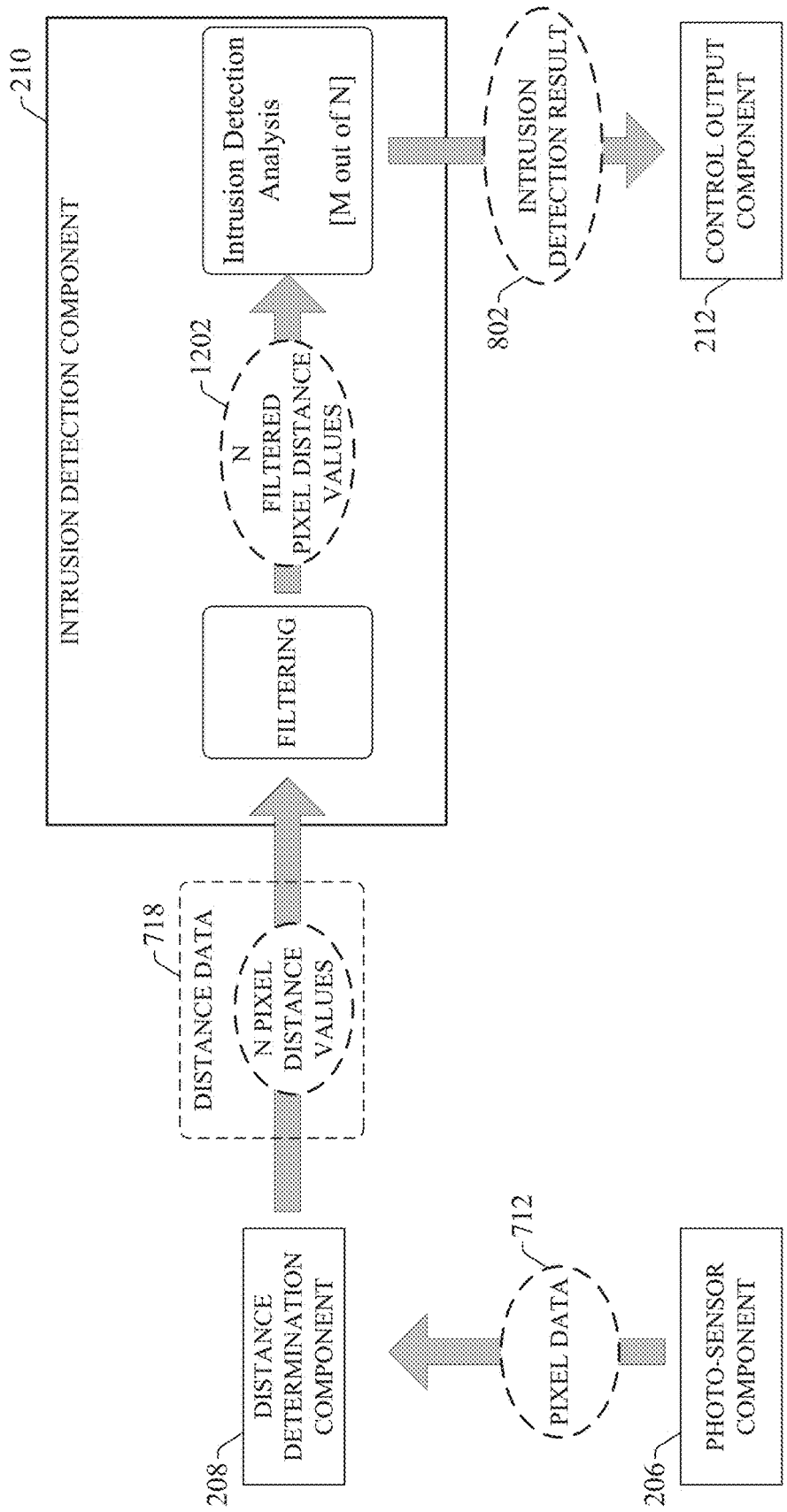
FIG. 12 is a diagram illustrating a generalized data flow implemented by embodiments of a TOF sensor device that support filtering of a pixel set.

In order to improve sensing precision, one or more embodiments of intrusion detection component 210 can transform the raw distance samples generated by pixel set 704 into an improved set of distance samples by applying a filter or another type of transformation to the pixel set 704. FIG. 12 is a diagram illustrating a generalized data flow implemented by embodiments of TOF sensor device 202 that support filtering of a pixel set 704. As in the example data flow illustrated in FIG. 8, distance data 718, comprising the N pixel distance values of pixel set 704, is provided to intrusion detection component 210. In this example, intrusion detection component 210 filters the N distance values to yield a transformed data set 1202 of N filtered pixel distance values. Intrusion detection component 210 then applies the M-out-of-N analysis to the transformed data set 1202 rather than the original set of samples represented by distance data 718.

Figure 13:
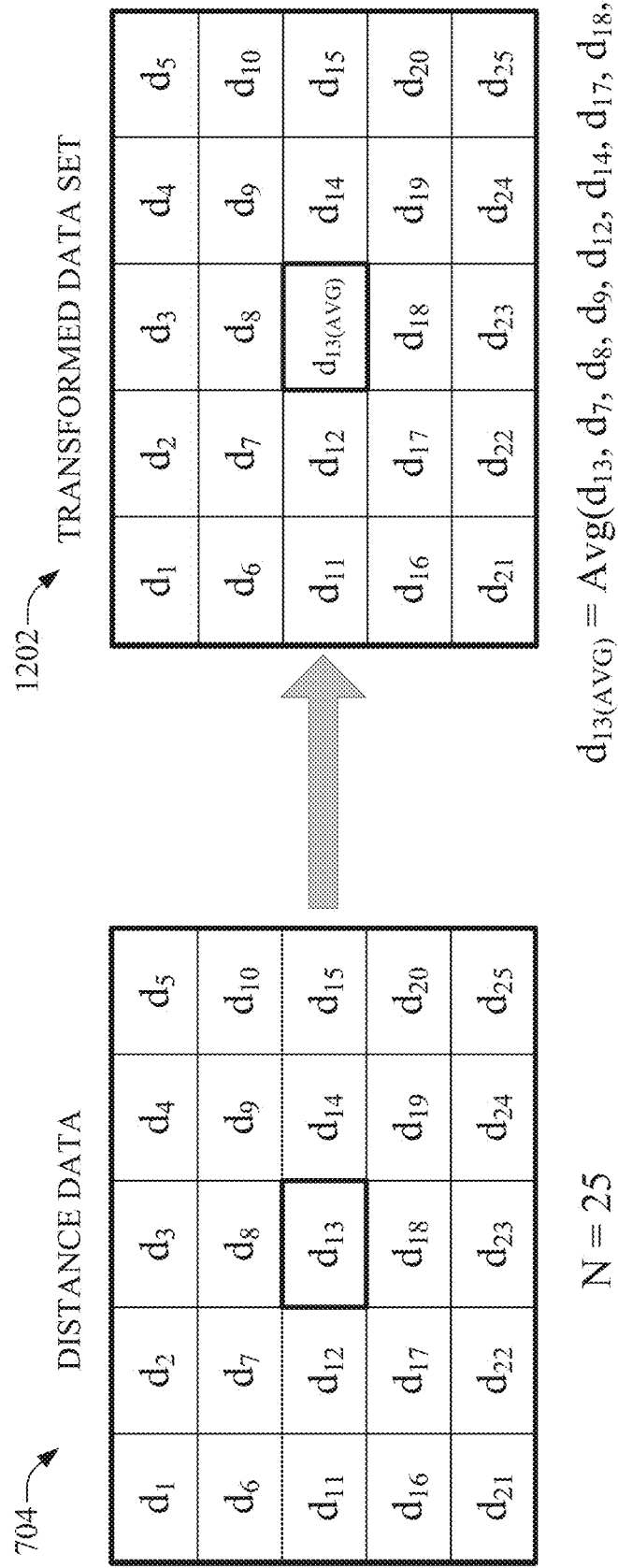
FIG. 13 is a diagram illustrating transformation of a distance sample of a 25-sample pixel set.

Any suitable type of filtering can be applied to the distance data 718 by the intrusion detection component 210 according to various embodiments. For example, in some embodiments intrusion detection component 210 can replace a given distance value of distance data 718 with a weighted average of the distance value and its neighboring distance values. FIG. 13 is a diagram illustrating transformation of one of the distance samples $d_{13}$ of a 25-sample pixel set 704 represented by distance data 718. In this example, the value of sample $d_{13}$ is replaced by $d_{13(AVG)}$, which is an average of original distance value $d_{13}$ and its adjacent neighboring distance values ($d_7$, $d_8$, $d_9$, $d_{12}$, $d_{14}$, $d_{17}$, $d_{18}$, $d_{19}$). In various embodiments, this transformation can be applied to all distance values of the pixel set 704, or to only a selected subset of the distance values (e.g. a subset of the distance values identified as outliers that fall outside a valid distance range), to yield the transformed data set 1202. The M-out-of-N analysis described above can then be applied to the transformed data set 1202 in order to determine whether at least M of the distance values of the transformed data set 1202 satisfy the defined intrusion criterion, and if so a safety action can be initiated by the control output component 212.

This averaging technique is only intended to be an example type of filtering that can be applied to the pixel set 704. Other types of filtering are also within the scope of one or more embodiments. For example, in some embodiments, rather than averaging each distance value with its immediate neighboring or adjacent distance values within the pixel set 704 (a spatial averaging), each distance value can be averaged over a defined time range to yield the transformed data set 1202 (a temporal averaging). In such examples, distance samples can be captures for multiple instances or snapshots of time within a measuring cycle, and the distance samples collected for each pixel can be averaged, yielding an array of time-averaged distance values. In still other embodiments, a combination of both spatial averaging and temporal averaging can be applied to the distance values of the pixel set 704 to yield the transformed data set 1202. Other types of filtering that do not involve averaging are also within the scope of one or more embodiments, including but not limited to application of weight values to each distance value according to a defined weighing criterion (e.g., a determination of whether the distance values are near an extreme edge of the sensor device's sensing range, a determined reflectivity of the point on the person or object represented by the pixel, etc.).

Figure 14:
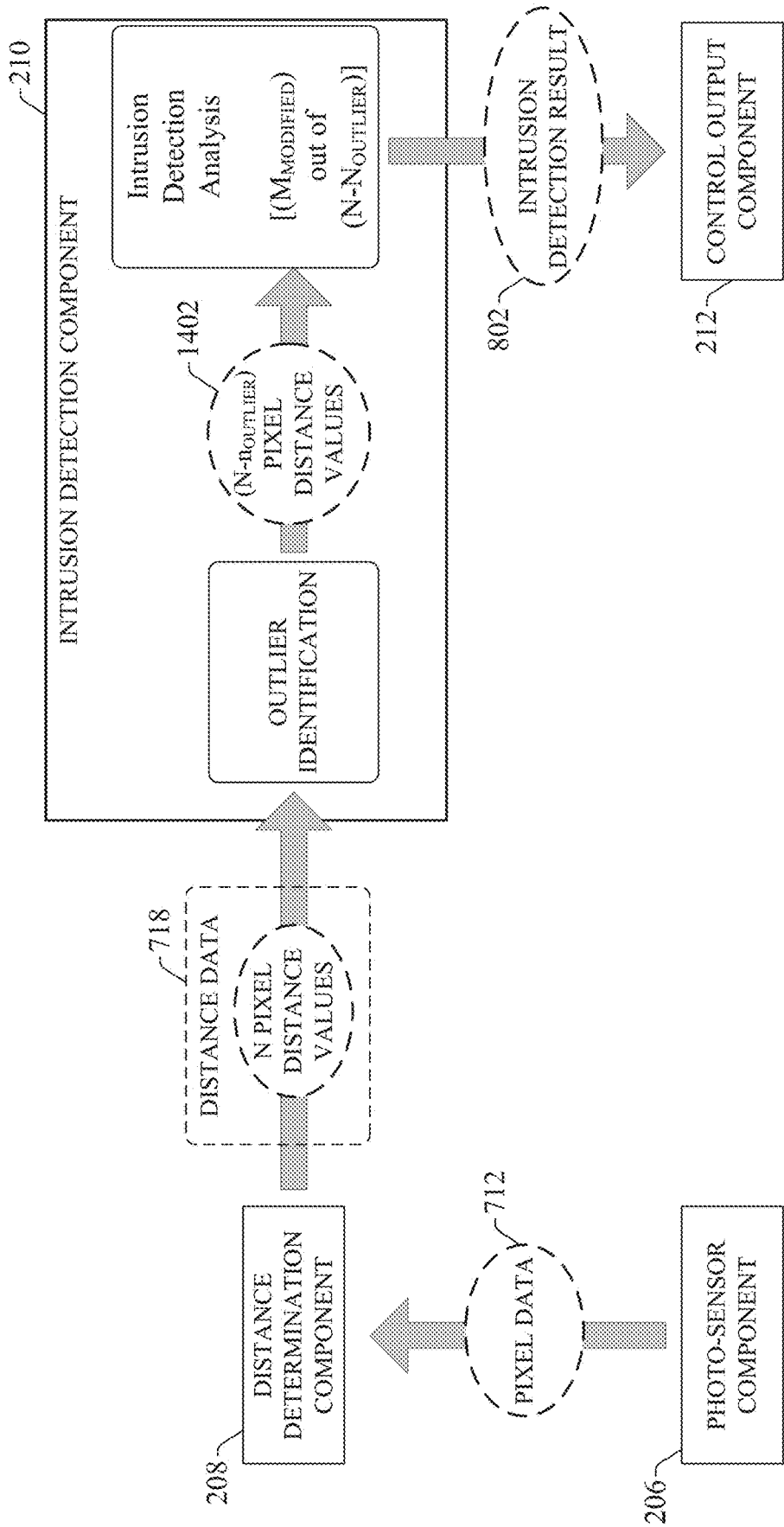
FIG. 14 is a diagram illustrating a generalized data flow implemented by embodiments of a TOF sensor device that support outlier removal.

In some embodiments, intrusion detection component 210 can also be configured to identify and remove outlier distance values from the pixel set 704. FIG. 14 is a diagram illustrating a generalized data flow implemented by embodiments of TOF sensor device 202 that support outlier removal. As in the example data flow described above in connection with FIG. 8, distance data 718 defining N distance values of the N-pixel pixel set 704 are provided to intrusion detection component 210 for processing and analysis. In this example, prior to performing M-out-of-N analysis on the data set to determine whether the object corresponding to the pixel set is within the protective field, intrusion detection component 210 identifies and removes any outlier distance values that may be included in the distance data 718. Outlier distance values can be defined as values that either exceed the upper bound of the sample's expected mean or are less than the lower bound of the sample's expected mean. Using this outlier detection criterion, intrusion detection component 210 identifies and removes such distance values to yield a reduced data set 1402 of $(N-N_{OUTLIER})$ values, where $N_{OUTLIER}$ is the number of outlier distance values identified and removed from the data set by intrusion detection component 210. Some embodiments of TOF sensor device 202 can be allow users to set the upper and lower bounds for outlier detection via user interface component 214.

If outliers are identified and removed to yield the reduced data set 1402, intrusion detection component 210 can also determine an appropriate modified value of M—referred to as $M_{MODIFIED}$—for the smaller sample size. That is, intrusion detection component 210 can select a value of $M_{MODIFIED}$ for the reduced number of samples ($N-N_{OUTLIER}$) that still satisfy a required minimum detection probability $P_d$ for a given sensing application. For example, a pixel set 704 may initially comprise 25 pixels (N=25) and the default value of M used as the threshold for determining whether an object is intruding within the protective field may be 15. If no outliers are removed, this configuration can achieve a detection probability of $P_d=1-10^{-7}$ if the individual pixel detection probability is $p_0=0.95$. If two outliers are detected and removed, the value of N becomes 23. In order to achieve the same detection probability of $P_d=1-10^{-7}$, M can be reduced to 14 ($M_{MODIFIED}=14$) for the present measuring cycle and still meets the required $P_d$. In some embodiments, intrusion detection component 210 can determine a suitable value of $M_{MODIFIED}$ using equation (5) above by substituting the desired probability $P_d$ for P (where $P_d$ may be a desired detection probability previously set by the user via user interface component 214), substituting ($N-N_{OUTLIER}$) for N, and solving for M to obtain $M_{MODIFIED}$.

The detection probability $P_d$ that can be achieved by a reduced data set may be partly a function of the detection distance. For example, if N=25 and M=14, and two outliers are removed, a modified configuration of N=23 and M=14 (where M remains unchanged) can yield a same detection probability if the outlier distances are sufficiently long. Alternatively, if the outlier distances are sufficiently short, keeping N=25 can increase the probability of a false alert but still maintain a safe system as the probability of detection remains above the required level.

If the total number $N_{OUTLIER}$ of outliers identified and removed is too large, the resulting reduced data set 1402 may have a total number of remaining distance values that is too small to achieve a desired detection probability $P_d$. That is, for a sufficiently small value of ($N-N_{OUTLIER}$) there may be no possible value of M that will satisfy both $P_d$ and $P_{fa}$ requirements without increasing the tolerance zone size significantly. Accordingly, intrusion detection component 120 can be configured to limit the number $N_{OUTLIER}$ of outliers removed from the data set.

In some embodiments, rather than remove the outlier distance values, intrusion detection component 210 may be configured to replace the outlier values with estimated values determined based on the remaining valid distance samples in the pixel set 704, thereby keeping the values of M and N the same for the M-out-of-N intrusion detection analysis. For example, in some embodiments intrusion detection component 210 can be configured to replace an outlier distance value with an average of the distance values associated with the pixels adjacent to the outlier pixel, thereby maintaining the value of N and eliminating the need to modify the value of M.

The M-out-of-N techniques described above are sufficiently robust to tolerate a relatively small number of outlier distance values (or otherwise wrong values) within the set of samples while still maintaining a safe system. If a sufficiently small number of outliers are detected, the probability of detection $P_d$ can still remain above the required level without the need to change the values of M or N.

In some embodiments, intrusion detection component 210 can be configured to apply both outlier removal (as illustrated in FIG. 14) and filter processing (as illustrated in FIG. 12) prior to performing the M-out-of-N intrusion detection analysis.

Embodiments of the TOF sensor device 202 described above can achieve a high level of intrusion detection accuracy while keeping the probability of false detections low. This high level of detection reliability can render embodiments of TOF sensor device 202 suitable for use as safety monitoring devices within the context of an industrial safety system. In such systems, the control output component 212 can be configured to generate a safety output in response to a determination by the intrusion detection component 210 that an object or person has intruded within the monitored protective field (based on the M-out-of-N analysis described in the examples above). In an example scenario, TOF sensor device 202 may be configured to monitor an area surrounding a hazardous industrial machine or automation system to ensure that people or objects (e.g., vehicles such as fork lifts) do not approach the hazardous area within a defined minimum safe distance (the protective field in this example scenario). Accordingly, control output component 212 can be configured to generate a safety output in response to a determination by intrusion detection component 210 that at least M out of the N distance values of the selected pixel set 704 for a detected object are less than the defined safe distance $D_P$. In some applications, the hazardous area may be defined as a distance range that begins a first distance away from the TOF sensor device 202 and ends at a second, longer distance area from the TOF sensor device 202. In such applications, the control output component 212 may be configured to generate the safety output signal in response to determining that at least M distance values of the N distance values of the pixel set 704 are within this distance band defined by the first and second distances.

The action initiated by the control output component 212 can depend on the type of safety application within which the TOF sensor device 202 is being used. In various non-limiting examples, a safety output signal generated by control output component 212 may be configured to disconnect power from the monitored automation system or machine, place the system or machine in a safe mode (e.g., a slow operation mode), send a notification to one or more client devices to alert personnel that a person or object has been detected within the hazardous area, or perform other such safety actions.

FIGS. 15A-17C illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 15A:
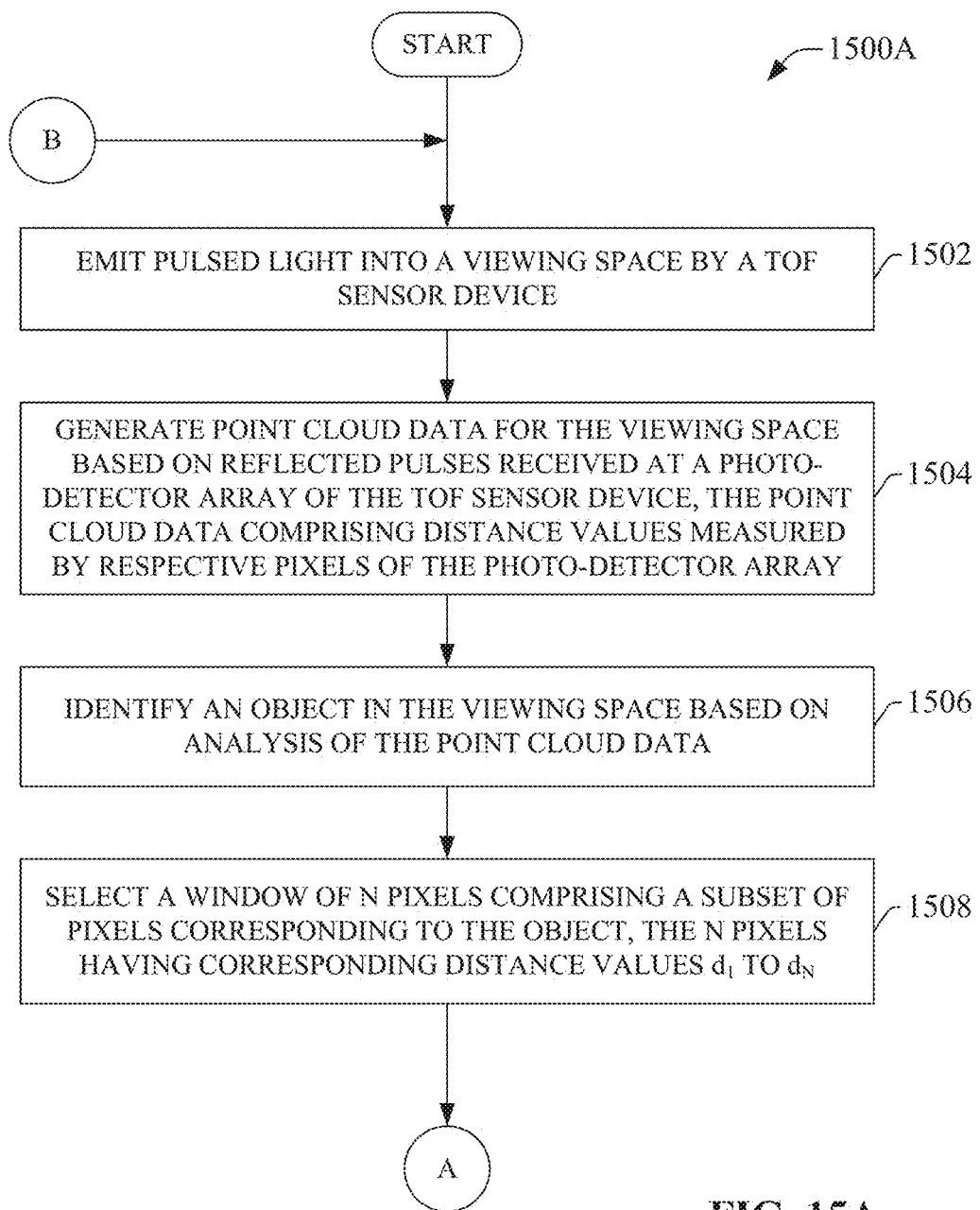
FIG. 15A is a flowchart of a first part of an example methodology for determining whether a detected object is within a protective field monitored by a TOF sensor device.

FIG. 15A illustrates a first part of an example methodology 1500A for determining, by a TOF sensor device, whether a detected object is within a protective field. Initially, at 1502, pulsed light is emitted into a viewing space by a TOF sensor device. At 1504, point cloud data for the viewing space is generated based on reflected pulses received at a photo-detector array of the TOF sensor device. The point cloud data comprises distance values measured by respective pixels of the photo-detector array. Any suitable technique for estimating the propagation times of the received pulses and estimating corresponding distance values associated with each pixel of the array are within the scope of one or more embodiments.

At 1506, an object in the viewing space is identified based on analysis of the point cloud data. Any suitable technique can be implemented to identify the object, including but not limited to edge detection, object surface pattern or contour analysis, or other such techniques. In some embodiments, if 2D imaging data is available for the viewing space, the objects can be detected using grayscale or red-blue-green (RBG) analysis.

At 1508 a window of N pixels comprising a subset of pixels corresponding to the object is selected. The N pixels each have corresponding distance values identified as di through $d_N$, which represented the measured distances of respective points on the object corresponding to the respective pixels. The window of N pixels can be of any shape, including either regular shapes (e.g., squares, rectangles, circles, etc.) or irregular shapes.

Figure 15B:
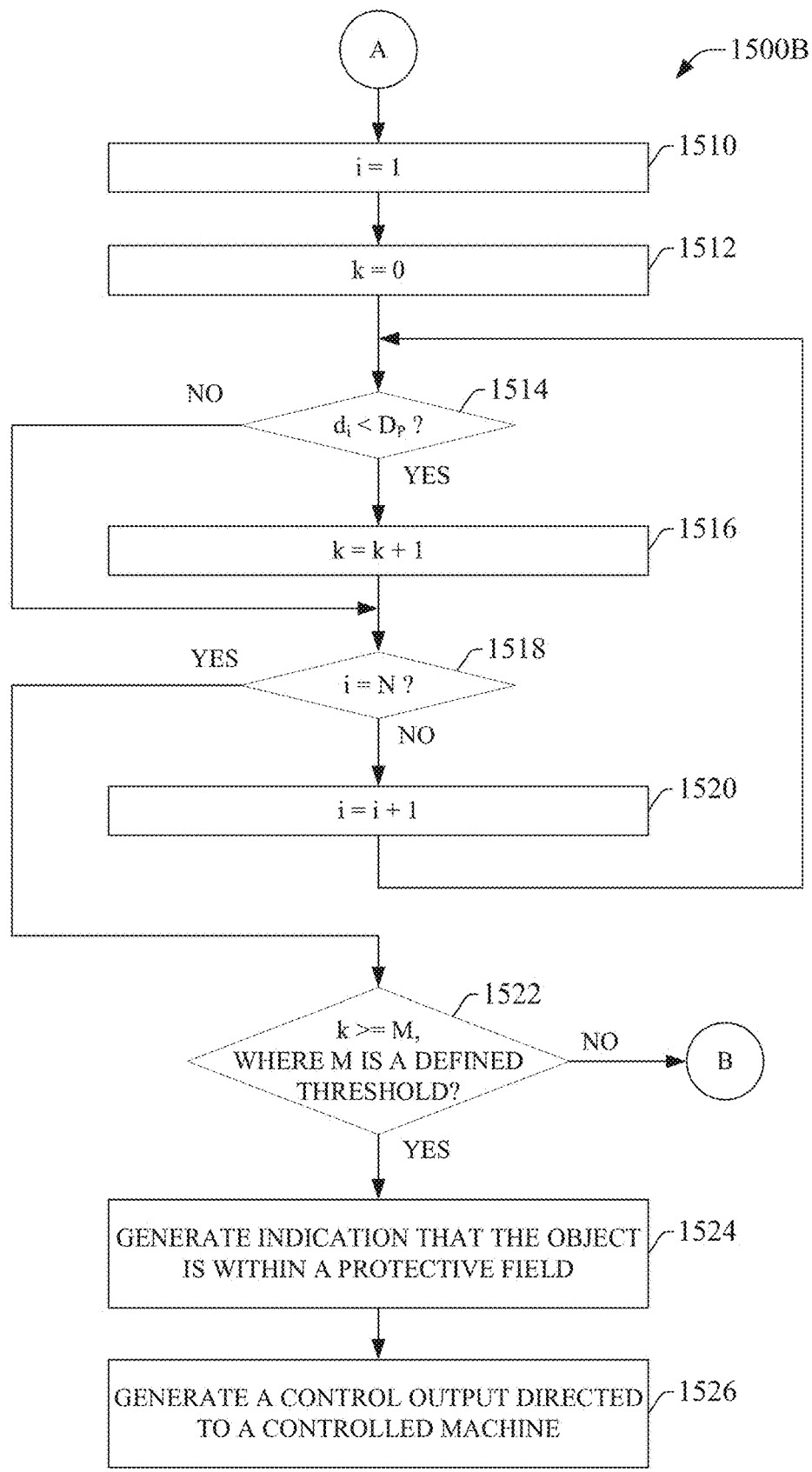
FIG. 15B is a flowchart of a second part of the example methodology for determining whether a detected object is within a protective field monitored by a TOF sensor device.

The methodology continues with the second part 1500B illustrated in FIG. 15B. At 1510, an integer variable i is set equal to 1, where i will serve as a pointer that selects each distance value $d_1$ through $d_N$ in turn for analysis. At 1512, another integer value k is set equal to 0, where k will serve as a counter that indicates the number of distance values that satisfy an intrusion criterion. At 1514, a determination is made as to whether distance $d_i$ is less than a threshold distance $D_P$ of a protective field. This represents the intrusion criterion indicating whether the distance value is indicative of the object being located within the protective field. Although the intrusion criterion is depicted in step 1514 as being a determination of whether distance $d_i$ is less than a threshold distance $D_P$, other intrusion criterion may also be used in addition to or instead of this intrusion criterion.

If $d_i$ is less than threshold distance $D_P$ (YES at step 1514), the methodology proceeds to step 1516, where the counter value k is incremented. Alternatively, if $d_i$ is not less than threshold distance $D_P$ (NO at step 1514), the methodology proceeds to step 1518 without incrementing integer k.

At 1518, a determination is made as to whether pointer value i is equal to N, indicating that all distance values $d_1$ through $d_N$ have been evaluated against the intrusion criterion. If i is not equal to N (NO at step 1518), the methodology proceeds to step 1520, where pointer value i is incremented, and steps 1514-1518 are repeated for the next distance value of the N distance values.

When i is equal to N (YES at step 1518), indicating that all distance values $d_1$ through $d_N$ have been evaluated against the intrusion criterion, the methodology proceeds to step 1522, where a determination is made as to whether the counter integer k is equal to or greater than a defined threshold value M. If k is not equal to or greater than M (NO at step 1522), the methodology returns to step 1502 and steps 1502-1522 are repeated. Alternatively, if k is equal to or greater than M (YES at step 1522), an indication that the object is within the proactive field is generated at step 1524, and a control output directed to a controlled machine is generated at step 1526. The control output can be configured to perform any suitable safety action, including but not limited to disconnecting power from a hazardous machine within the protective field, placing the machine in a safe operating mode, altering the motion of the machine to avoid a trajectory of the detected object, or other such safety measures.

In some embodiments, the methodology depicted in FIGS. 15A and 15B can be performed multiple times for a given intrusion detection measuring sequence, with the values of N and M being increased for each iteration. In such embodiments, steps 1524 and 1526 will generate the indication that the object is within the protective field and generate the control output based on an aggregation of results from the multiple iteration, rather than based on a single iteration.

Figure 16A:
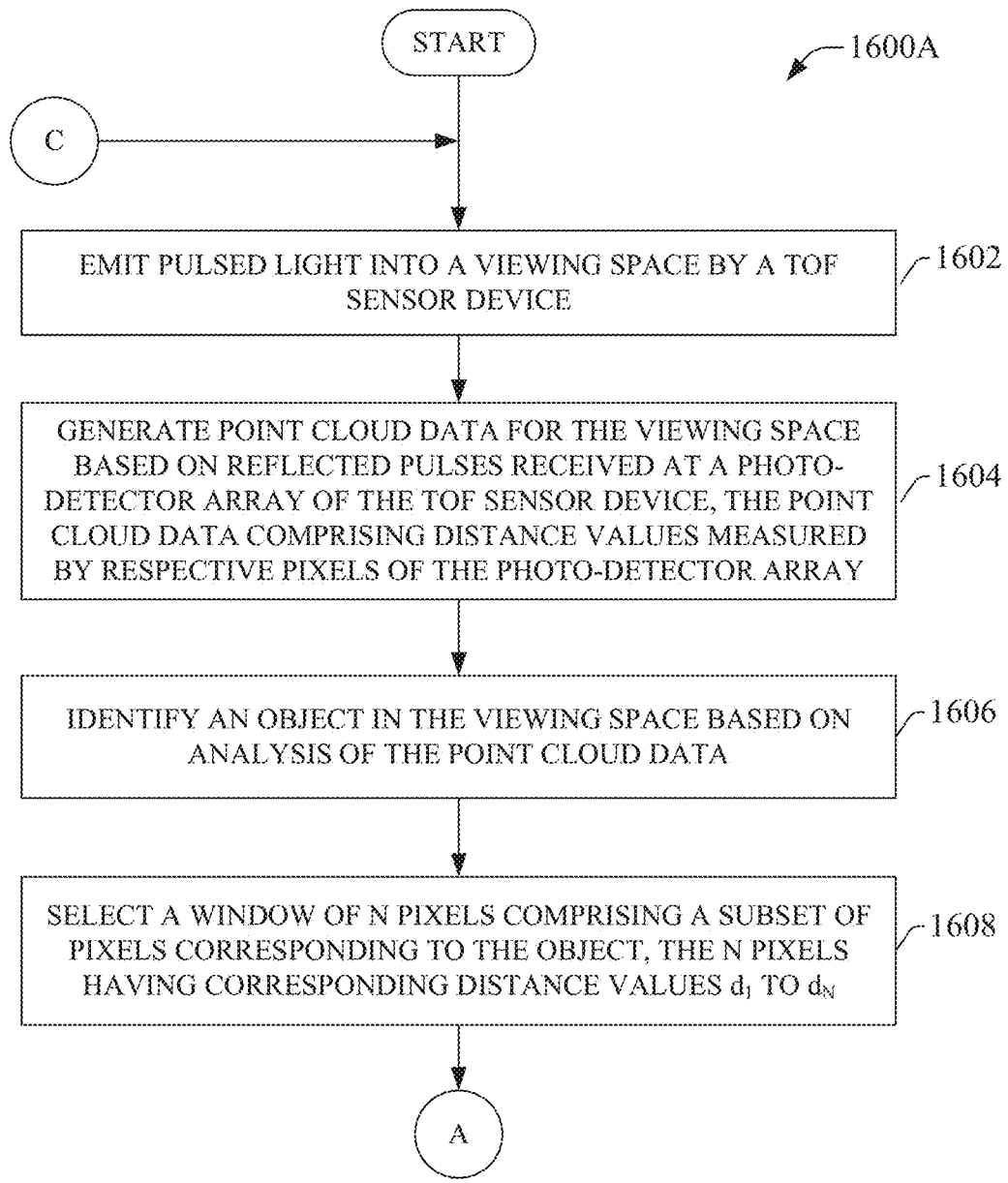
FIG. 16A is a flowchart of a first part of an example methodology for determining whether a detected object is within a protective field based on a set of corrected distance measurements.

FIG. 16A illustrates a first part of an example methodology 1600A for determining, by a TOF sensor device, whether a detected object is within a protective field based on a set of corrected distance measurements. Initially, at 1602, pulsed light is emitted into a viewing space by a TOF sensor device. At 1604, point cloud data for the viewing space is generated based on reflected pulses received at a photo-detector array of the TOF sensor device, where the point cloud data comprises distance values measured by respective pixels of the photo-detector array. At 1606, an object in the viewing space is identified based on analysis of the point cloud data. At 1608, a window of N pixels comprising a subset of pixels corresponding to the object is selected, the N pixels having associated distance values identified as $d_1$ through $d_N$. In general, steps 1602-1608 are similar to corresponding steps 1502-1508 described above in connection with FIGS. 15A-15B.

Figure 16B:
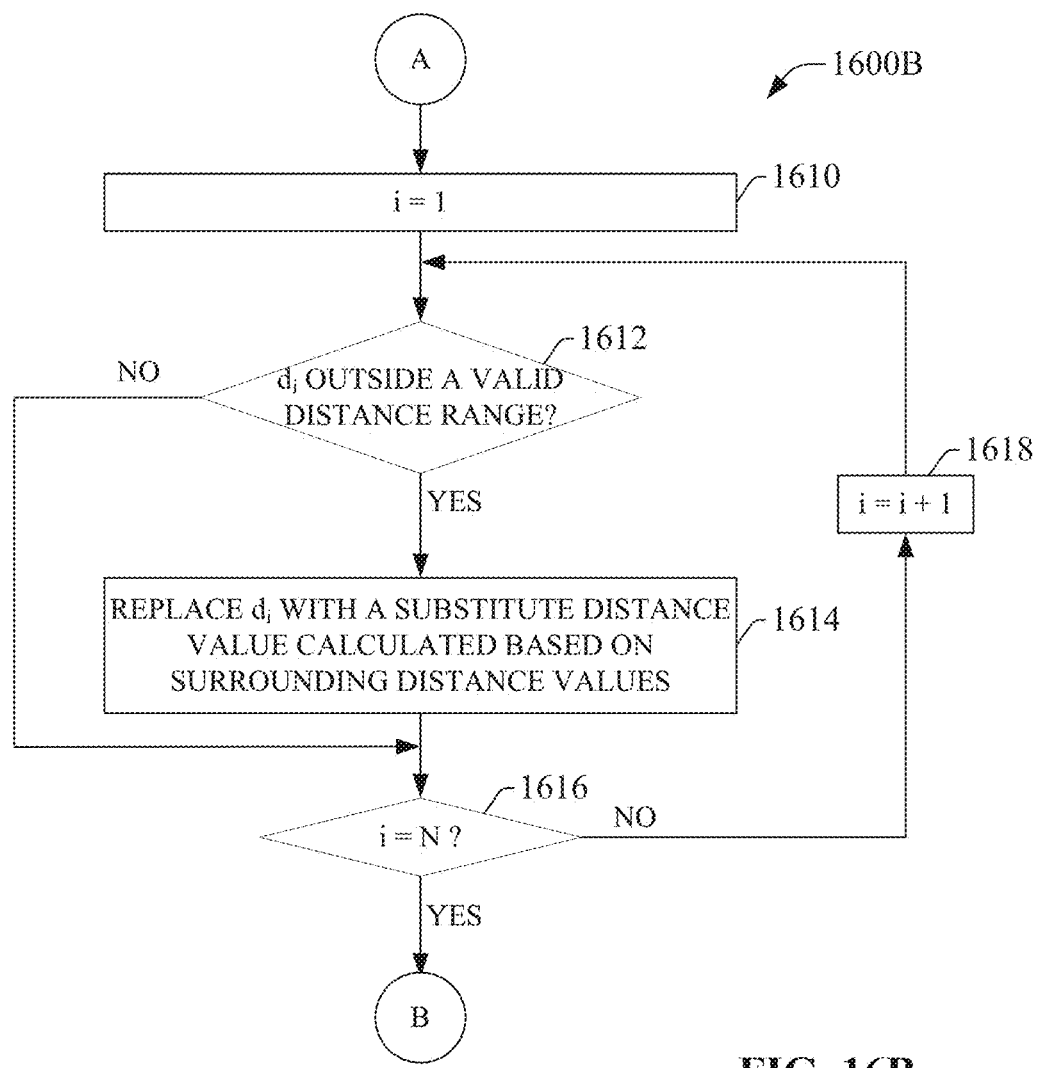
FIG. 16B is a flowchart of a second part of the example methodology for determining whether a detected object is within a protective field based on a set of corrected distance measurements.

The methodology proceeds to the second part 1600B illustrated in FIG. 16B. At 1610, a pointer value i is set equal to 1 (similar to step 1510 described above in connection with FIG. 15B). At 1612, a determination is made as to whether distance value $d_i$ is outside a valid distance range. The valid distance range is defined as an expected range of valid distances for the N distance values, where distance values falling outside this valid distance range are identified as outlier values that should be replaced with estimated values. If $d_i$ is determined to be outside the valid distance range (YES at step 1612), the methodology proceeds to step 1614, where $d_i$ is replaced with a substitute distance value that is calculated based on distance values associated with pixels surrounding the $i^{th}$ pixel in the N-pixel array. In an example implementation, the outlier distance value $d_i$ may be replaced by an average of the distances associated with the pixels that are immediately adjacent to the $i^{th}$ pixel (as described above in connection with FIG. 13). Other approaches for replacing outlier distance di are also within the scope of one or more embodiments of this disclosure. Alternatively, if distance $d_i$ is not outside the valid distance range (NO at step 1612), the methodology proceeds to step 1616 without replacing distance $d_i$.

At 1616, a determination is made as to whether pointer integer i is equal to N, indicating that all N distance values have been assessed for outliers. If i is not equal to N (NO at step 1616), the methodology proceeds to step 1618, where i is incremented, and steps 1612-1616 repeated for the next distance value $d_i$ of the N-pixel window. When all N values have been evaluated for outliers (YES at step 1616), the methodology proceeds to the third part 1600C illustrated in FIG. 16C.

At 1620, pointer value i is again set to one. At 1622, counter integer k is set to zero. At 1624, a determination is made as to whether distance value $d_i$ is less than threshold distance $D_P$. If distance value $d_i$ is less than $D_P$ (YES at step 1624), counter value k is incremented at step 1626. If distance value $d_i$ is not less than $D_P$ (NO at step 1624), the methodology proceeds to step 1628 without incrementing counter k.

At 1628, a determination is made as to whether pointer value i is equal to N, indicating that all N distance values have been evaluated against the threshold distance $D_P$. If I is not equal to N (NO at step 1628), pointer value i is incremented at step 1630, and steps 1624-1628 are repeated for the next distance value of the N distance values. When all distance values have been evaluated against the threshold distance $D_P$ (YES at step 1628), the methodology proceeds to step 1632, where a determination is made as to whether counter value k is equal to or greater than a defined threshold number M. If k is not equal to or greater than M (NO at step 1632), the methodology returns to step 1602 and steps 1602-1632 are repeated. Alternatively, if k is equal to or greater than M (YES at step 1632), an indication that the object is within a proactive field is generated at step 1634, and a control output directed to a controlled machine is generated at step 1636. Steps 1620-1636 are substantially similar to corresponding steps 1510-1526 described above in connection with FIG. 15B.

Figure 16C:
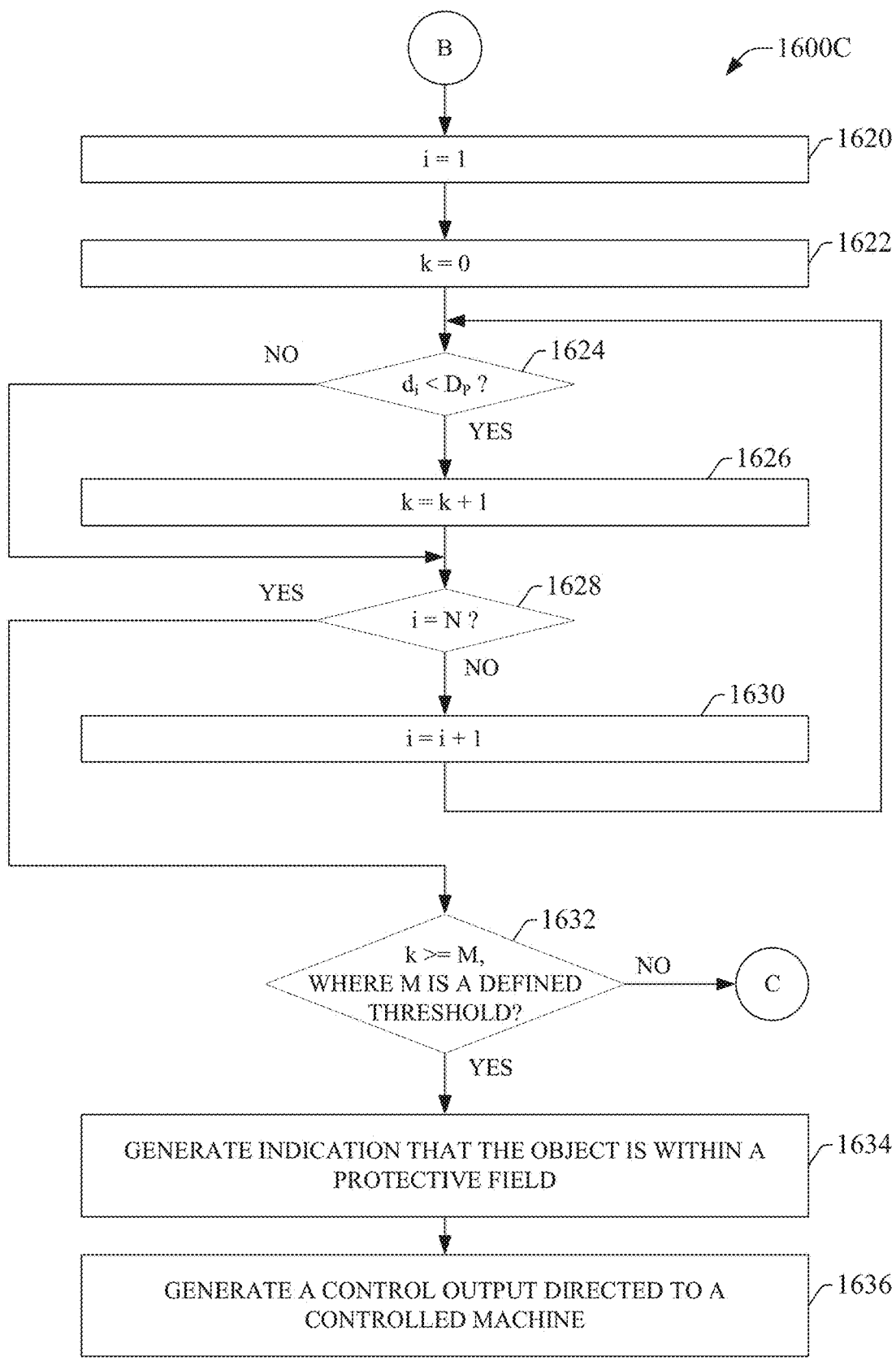
FIG. 16C is a flowchart of a third part of the example methodology for determining whether a detected object is within a protective field based on a set of corrected distance measurements.

As with the methodology described above in connection with FIGS. 15A-15B, the methodology of FIGS. 16A-16C can be performed multiple times per intrusion detecting measuring sequence in some embodiments, with the values of N and M being increased for each iteration.

Figure 17A:
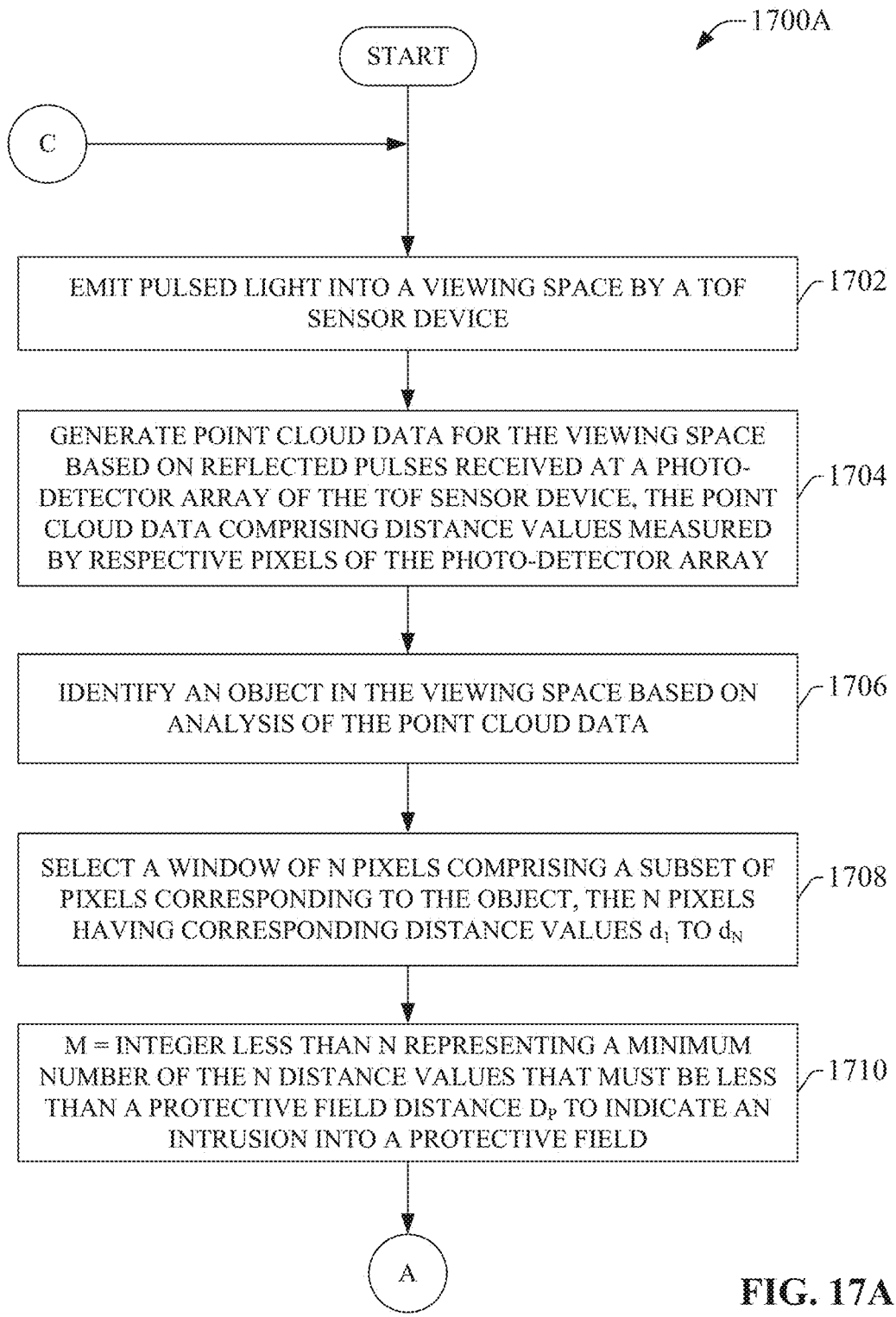
FIG. 17A is a flowchart of a first part of an example methodology for determining whether a detected object is within a protective field based on a modified set of distance measurements.

FIG. 17A illustrates a first part of an example methodology 1700A for determining, by a TOF sensor device, whether a detected object is within a protective field based on a modified set of distance measurements. Initially, at 1702, pulsed light is emitted into a viewing space by a TOF sensor device. At 1704, point cloud data for the viewing space is generated based on reflected pulses received at a photo-detector array of the TOF sensor device, where the point cloud data comprises distance values measured by respective pixels of the photo-detector array. At 1706, an object in the viewing space is identified based on analysis of the point cloud data. At 1708, a window of N pixels comprising a subset of pixels corresponding to the object is selected, the N pixels having associated distance values identified as $d_1$ through $d_N$. In general, steps 1702-1708 are similar to corresponding steps 1502-1508 described above in connection with FIGS. 15A-15B.

At 1710, an integer value M is defined to be a value less than N, representing a minimum number of the N distance values $d_1$ through $d_N$ that must be less than a protective field distance $D_P$ in order to indicate an intrusion of an object into a protective field.

Figure 17B:
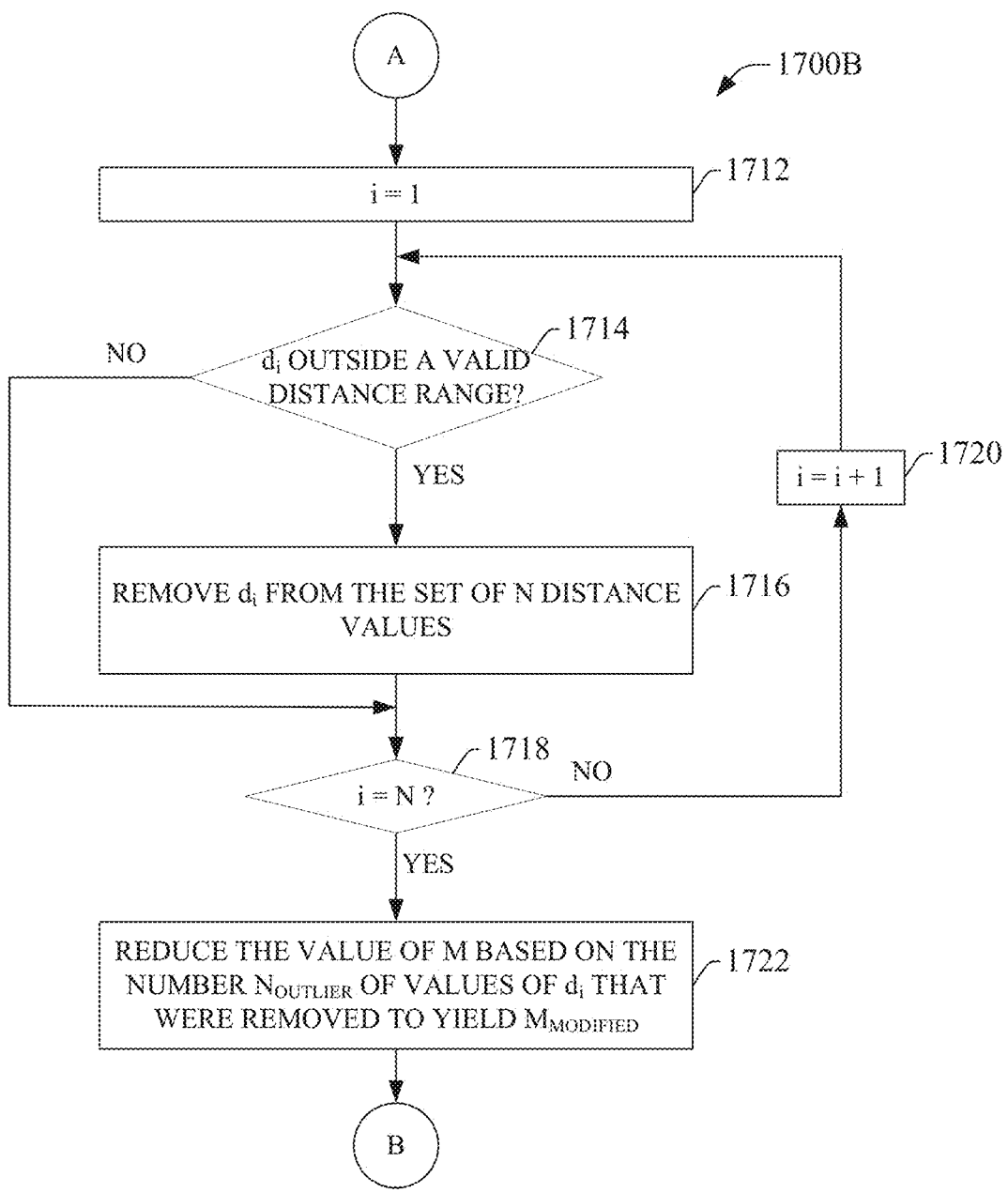
FIG. 17B is a flowchart of a second part of the example methodology for determining whether a detected object is within a protective field based on a modified set of distance measurements.

The methodology continues with the second part 1700B illustrated in FIG. 17B. At 1712, a pointer value i is set equal to 1. At 1714, a determination is made as to whether a distance value $d_i$ associated with an $i^{th}$ pixel of the N pixels is outside a valid distance range (similar to step 1612 described above in connection with FIG. 16B). If distance $d_i$ is outside the valid distance range (YES at step 1714), the methodology proceeds to step 1716, where distance value $d_i$ is removed from the set of N distance values. If distance $d_i$ is not outside the valid distance range (NO at step 1714), the methodology proceeds to step 1718 without removing the distance value $d_i$.

At 1718, a determination is made as to whether pointer value i is equal to N, indicating that all N distance values $d_1$ through $d_N$ have been checked for outliers. If i is not equal to N (NO at step 1718), the methodology proceeds to step 1720, where i is incremented, and steps 1714-1718 are repeated for the next distance value of the N distance values. When all N distance values have been checked for outliers (YES at step 1718), the methodology proceeds to step 1722, where the value of M is reduced based on the number $N_{OUTLIER}$ of distance values $d_i$ that were removed as being outliers, yielding a modified value $M_{MODIFIED}$. Any suitable technique for determining an appropriate reduction of M is within the scope of one or more embodiments. For example, in some embodiments M may be reduced by the same amount by which N was reduced after removal of outliers. Alternatively, an algorithm can be used to determine a suitable value of $M_{MODIFIED}$ given the number $N_{OUTLIER}$ of removed distance values that will maximize a probability of detection of an object within the protective field.

Figure 17C:
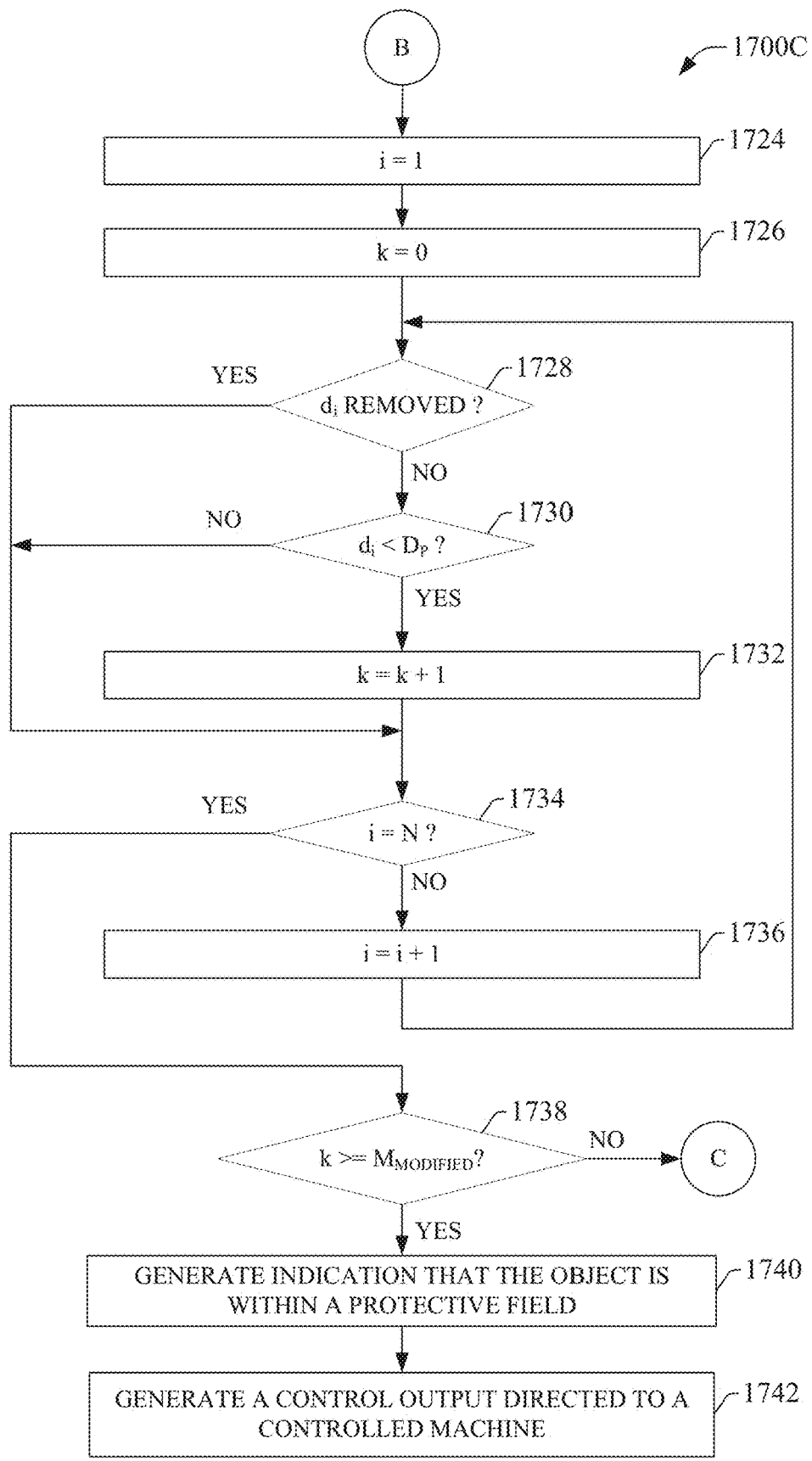
FIG. 17C is a flowchart of a second part of the example methodology for determining whether a detected object is within a protective field based on a modified set of distance measurements.

The methodology continues with the third part 1700C illustrated in FIG. 17C. At 1724, pointer value i is again set to one. At 1726, counter integer k is set to zero. At 1728 a determination is made as to whether the $i^{th}$ distance value $d_i$ was removed at step 1716. If distance value $d_i$ was not removed (NO at step 1728), a determination is made at step 1730 as to whether distance value $d_i$ is less than threshold distance $D_P$. If distance value $d_i$ is less than $D_P$ (YES at step 1730), counter value k is incremented at step 1732. If distance value $d_i$ is not less than $D_P$ (NO at step 1730), the methodology proceeds to step 1734 without incrementing counter k. If distance value di had been removed at step 1716 (YES at step 1728), the methodology proceeds to step 1734 without comparing distance value $d_i$ with the threshold distance $D_P$ at step 1730.

At 1734, a determination is made as to whether pointer value i is equal to N, indicating that all non-removed distance values $d_1$ through $d_N$ have been compared with the threshold distance $D_P$. If i is not equal to N (NO at step 1734), pointer value i is incremented at step 1736, and steps 1728-1734 are repeated for the next $i_{th}$ distance value $d_i$. When all non-removed distance values have been compared with the threshold distance $D_P$ (YES at step 1734), the methodology proceeds to step 1738, where a determination is made as to whether counter value k is equal to or greater than the value of $M_{MODIFIED}$ set at step 1722. If counter value k is not equal to or greater than $M_{MODIFIED}$ (NO at step 1738), the methodology returns to step 1702, and steps 1702-1738 are repeated. Alternatively, if counter value k is equal to or greater than $M_{MODIFIED}$ (YES at step 1738), an indication that the object is within a protective field is generated at step 1740, and a control output directed to a controlled machine is generated at step 1740 (similar to corresponding steps 1524 and 1526 described above in connection with FIG. 15B).

As with the methodologies described above in connection with FIGS. 15A-15B and 16A-16C, the methodology of FIGS. 17A-17C can be performed multiple times per intrusion detecting measuring sequence in some embodiments, with the values of N and M being increased for each iteration.

Although the methodologies described above in connection with FIGS. 15A-15B, 16A-16C, and 17A-17C were described separately, the methodologies can be combined within a common sensor device without departing from the scope of one or more embodiments of this disclosure.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
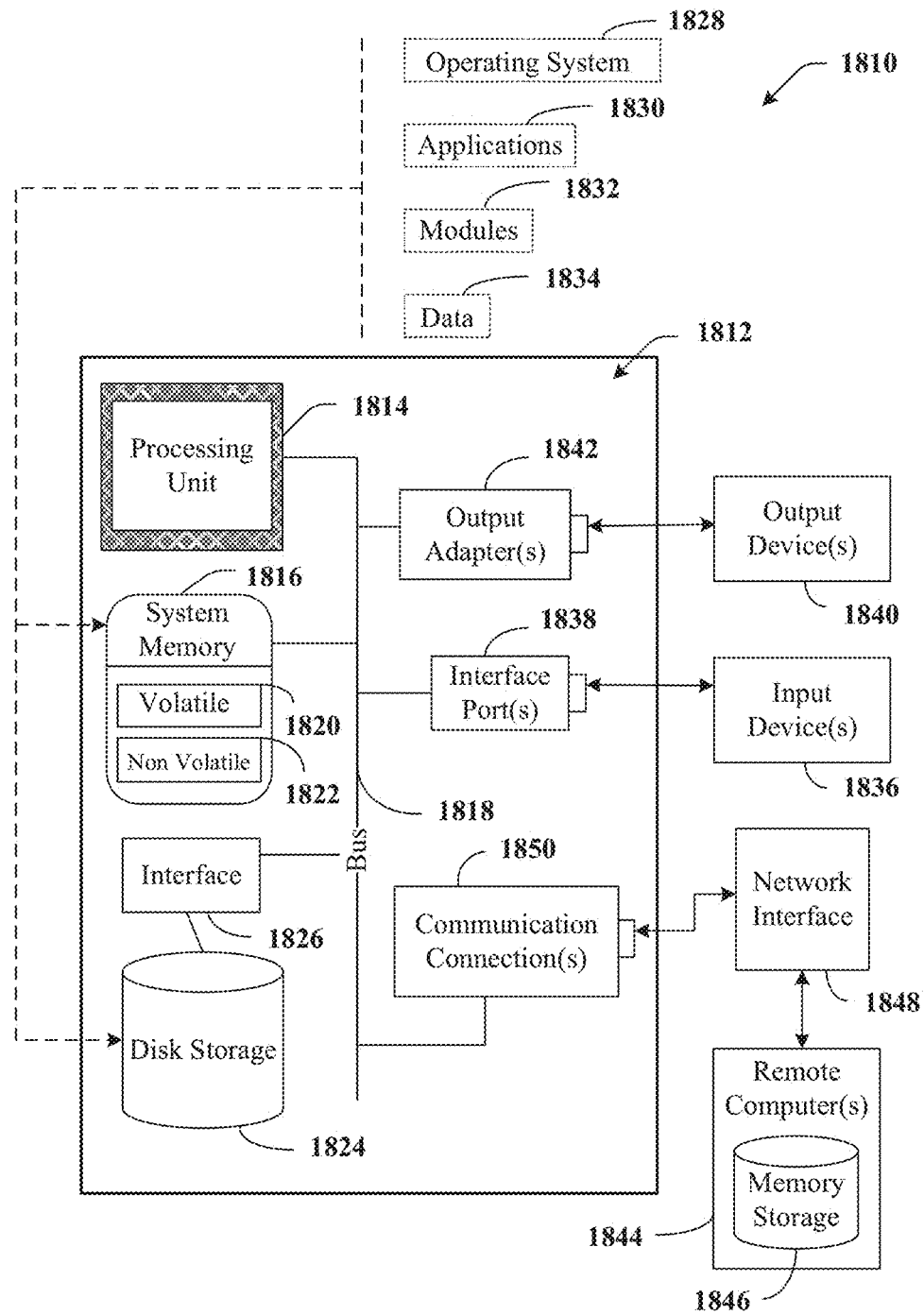
FIG. 18 is an example computing environment.
Figure 19:
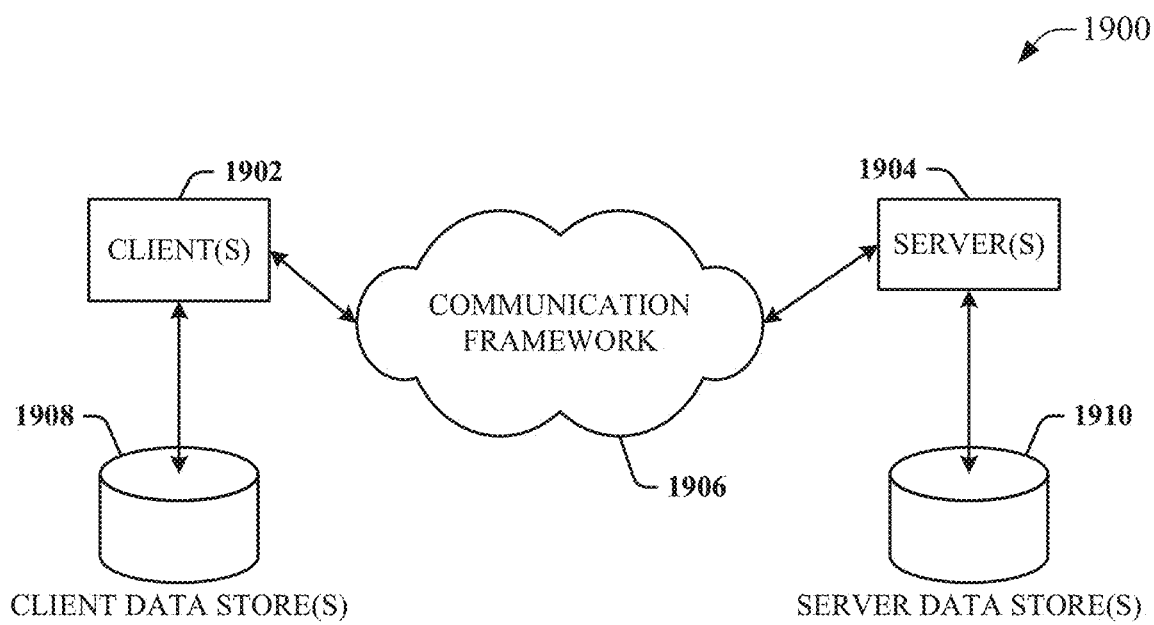
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented.

With reference to FIG. 18, an example environment 1810 for implementing various aspects of the aforementioned subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Multi-core microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable PROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer 1812. System applications 1830 take advantage of the management of resources by operating system 1828 through program modules 1832 and program data 1834 stored either in system memory 1816 or on disk storage 1824. It is to be appreciated that one or more embodiments of the subject disclosure can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapters 1842 are provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the system bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1700 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 1910 that can be employed to store information local to the servers 1904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A sensor device, comprising:
    a distance determination component configured to receive pixel data associated with respective pixels of a field of view, and to identify an object within the field of view corresponding to a first subset of the pixels; and
    an intrusion detection component configured to define a pixel window comprising a second subset of the first subset of the pixels, wherein the second subset comprises N pixels, and N is an integer,
    wherein
    the distance determination component is further configured to determine N distance values corresponding to the N pixels of the pixel window based on a subset of the pixel data corresponding to the second subset of the first subset of the pixels,
    the intrusion detection component is further configured to count a number K of the N distance values that are less than a defined distance threshold, and
    the sensor device further comprises a control output component configured to, in response to determining that the number K of the N distance values that are less than the defined distance threshold is equal to or greater than a defined threshold value M, generate an output signal configured to at least one of disconnect power from an industrial machine, place an industrial automation system in safe operation mode, or send a notification to one or more client devices.

2. The sensor device of claim 1, wherein
    the distance determination component is further configured to identify a subset of the N distance values that are outside a defined valid distance range, and replace the subset of the N distance values with replacement distance values to yield a modified set of N distance values; and the intrusion detection component is configured to count the number of the N distance values from the modified set of N distance values.

3. The sensor device of claim 2, wherein the distance determination component is configured to generate a replacement distance value, of the replacement distance values, for one of the subset of the N distance values corresponding to one of the pixels based on another subset of the N distance values corresponding to pixels that are adjacent to the one of the pixels.

4. The sensor device of claim 1, wherein the distance determination component is further configured to:

identify a subset of the N distance values that are outside a defined valid distance range, and remove the subset of the N distance values to yield a reduced set of distance values; and the intrusion detection component is configured to:

reduce the defined threshold value M based on a number of the subset of the N distance values removed by the distance determination component to yield a modified threshold value $M_{MODIFIED}$, count a number of the reduced set of distance values that are less than the defined distance threshold, and generate the output signal in response to determining that the number of the reduced set of distance values that are less than the defined distance threshold is equal to or greater than the modified threshold value $M_{MODIFIED}$.

5. The sensor device of claim 1, wherein the intrusion detection component is configured to set the number N of pixels comprising the pixel window based on a number of the first subset of the pixels corresponding to the object.

6. The sensor device of claim 5, wherein the intrusion detection component is further configured to select the threshold value M based on the number N.

7. The sensor device of claim 6, wherein the intrusion detection component is configured to select the threshold value M to achieve a defined minimum intrusion detection probability according to a detection probability algorithm that defines the intrusion detection probability as a function of M and N.

8. The sensor device of claim 1, wherein the distance determination component is further configured to determine the N distance values at multiple different times within a measuring sequence to yield multiple sets of N distance values, and the intrusion detection component is configured to, for each pixel of the pixel window, average a subset of the distance values, from the multiple sets of N distance values, corresponding to the pixel, wherein averaging the subset of the distance values for each pixel yields N averaged distance values, count the number K of the N averaged distance values that are less than the defined distance threshold, and generate the output signal in response to determining that the number K of the N averaged distance values is equal to or greater than the defined threshold value M.

9. A method for detecting intrusion of an object within a protective field, comprising:

receiving, by a sensor device comprising a processor, pixel data for respective pixels of a field of view;

identifying, by the sensor device based on analysis of the pixel data, an object within the field of view, wherein the object corresponds to a first subset of the pixels;

defining, by the sensor device, a pixel window comprising a second subset of the first subset of the pixels, wherein the second subset comprises N pixels, and N is an integer;

determining, by the sensor device, N distance values corresponding to the N pixels of the pixel window based on the pixel data;

counting, by the sensor device, a number K of the N distance values that are less than a defined distance threshold; and in response to determining that the number K of the N distance values that are less than the defined distance threshold is equal to or greater than a defined threshold value M, generating, by the sensor device, an output signal configured to at least one of disconnect power from an industrial machine, place an industrial automation system in safe operation mode, or send a notification to one or more client devices.

10. The method of claim 9, wherein the determining the N distance values comprises:

identifying, based on the pixel data, a subset of the N distance values that are outside a defined valid distance range; and replacing the subset of the N distance values with replacement distance values to yield a modified set of N distance values.

11. The method of claim 10, wherein the replacing the subset of the N distance values comprises replacing each distance value, of the subset of the N distance values, corresponding to one of the pixels with a replacement value calculated based on another subset of the N distance values corresponding to pixels that are adjacent to the one of the pixels.

12. The method of claim 9, wherein the counting comprises:

identifying a subset of the N distance values that are outside a defined valid distance range, wherein the subset comprises $N_{OUTLINER}$ distance values, and $N_{OUTLINER}$ is an integer;

removing the $N_{OUTLINER}$ distance values from the N distance values to yield a reduced set of distance values;

reducing the defined threshold value M based on a value of $N_{OUTLINER}$ to yield a modified threshold value $M_{MODIFIED}$;

counting a number of the reduced set of distance values that are less than the defined distance threshold; and generating the output signal in response to determining that the number of the reduced set of distance values that are less than the defined distance threshold is equal to or greater than the modified threshold value $M_{MODIFIED}$.

13. The method of claim 9, wherein the defining the pixel window comprises setting the number N of pixels comprising the pixel window based on a number of the first subset of the pixels.

14. The method of claim 13, further comprising setting, by the sensor device, the threshold value M based on the number N of pixels comprising the pixel window.

15. The method of claim 14, wherein the setting the threshold value M comprises selecting the threshold value M to achieve a defined minimum intrusion detection probability according to a detection probability algorithm that defines the intrusion detection probability as a function of M and N.

16. A non-transitory computer-readable medium having stored thereon instructions that, in response to execution, cause a sensor device to perform operations, the operations comprising:

receiving pixel data for respective pixels of a field of view;

identifying an object within the field of view based on analysis of the pixel data, wherein the object corresponds to a first subset of the pixels;

defining a pixel window comprising a second subset of the first subset of the pixels, wherein the second subset comprises N pixels, and N is an integer;

determining N distance values corresponding to the N pixels of the pixel window based on a subset of the pixel data corresponding to the second subset of the first subset of the pixels;

counting a number K of the N distance values that are less than a defined distance threshold; and in response to determining that the number K of the N distance values that are less than the defined distance threshold is equal to or greater than a defined threshold value M, outputting a signal configured to at least one of disconnect power from an industrial machine, place an industrial automation system in safe operation mode, or send a notification to one or more client devices.

17. The non-transitory computer-readable medium of claim 16, wherein the counting comprises;

identifying a subset of the N distance values that are outside a defined valid distance range, wherein the subset comprises $N_{OUTLINER}$ distance values, and $N_{OUTLIER}$ is an integer;

removing the $N_{OUTLINER}$ distance values from the N distance values to yield a reduced set of distance values;

reducing the defined threshold value M based on a value of $N_{OUTLINER}$ to yield a modified threshold value $M_{MODIFIED}$;

counting, as the number K, a number of the reduced set of distance values that are less than the defined distance threshold; and generating the signal in response to determining that the number K of the reduced set of distance values that are less than the defined distance threshold is equal to or greater than the modified threshold value $M_{MODIFIED}$.

18. The non-transitory computer-readable medium of claim 16, wherein the defining the pixel window comprises setting the number N of pixels comprising the pixel window based on a number of the first subset of the pixels.

19. The non-transitory computer-readable medium of claim 16, wherein the determining the N distance values comprises:

identifying, based on the pixel data, a subset of the N distance values that are outside a defined valid distance range; and replacing the subset of the N distance values with replacement distance values to yield a modified set of N distance values.

20. The sensor device of claim 1, further comprising a user interface component configured to receive user input that defines the defined distance threshold.

* * * * *